(12) United States Patent
Takeshima et al.

(10) Patent No.: US 7,426,493 B2
(45) Date of Patent: Sep. 16, 2008

(54) ELECTRONIC MONEY SYSTEM AND ELECTRONIC MONEY TERMINAL

(75) Inventors: Yasuo Takeshima, Kanagawa (JP); Fumio Kubono, Tokyo (JP); Hiroshi Abe, Tokyo (JP); Kazuo Omori, Kanagawa (JP); Fumio Tsuyama, Kanagawa (JP); Hiroshi Nakayama, Chiba (JP)

(73) Assignee: Sony Corporation (JP)

( * ) Notice: Subject to any disclaimer, the term of this patent is extended or adjusted under 35 U.S.C. 154(b) by 1710 days.

(21) Appl. No.: 09/778,953

(22) Filed: Feb. 8, 2001

(65) Prior Publication Data
US 2001/0029488 A1    Oct. 11, 2001

(30) Foreign Application Priority Data
Feb. 9, 2000    (JP)    ............................ P2000-038083

(51) Int. Cl.
*G06Q 40/00*    (2006.01)
(52) U.S. Cl. ......................................................... 705/41
(58) Field of Classification Search .................... 705/41
See application file for complete search history.

(56) References Cited

U.S. PATENT DOCUMENTS

| | | | |
|---|---|---|---|
| 4,197,986 A | | 4/1980 | Nagata |
| 5,440,634 A | | 8/1995 | Jones et al. |
| 5,453,601 A | | 9/1995 | Rosen |
| 5,455,407 A | * | 10/1995 | Rosen .......................... 705/69 |
| 5,557,516 A | * | 9/1996 | Hogan .......................... 705/41 |
| 5,621,796 A | * | 4/1997 | Davis et al. .................... 705/68 |
| 5,703,949 A | * | 12/1997 | Rosen .......................... 705/65 |
| 5,845,293 A | | 12/1998 | Veghte et al. |
| 5,869,825 A | | 2/1999 | Ziarno |
| 6,012,049 A | * | 1/2000 | Kawan .......................... 705/41 |
| 6,032,135 A | * | 2/2000 | Molano et al. ................ 705/41 |
| 6,076,075 A | * | 6/2000 | Teicher ......................... 705/41 |
| 6,105,008 A | * | 8/2000 | Davis et al. ................... 705/41 |
| 6,178,409 B1 | | 1/2001 | Weber et al. |
| 6,302,326 B1 | * | 10/2001 | Symonds et al. ............ 235/379 |
| 6,324,525 B1 | * | 11/2001 | Kramer et al. ................ 705/40 |

(Continued)

FOREIGN PATENT DOCUMENTS

EP    0 242 624 A1    10/1987

(Continued)

OTHER PUBLICATIONS

Trembly A, Who Goes There? Biometrics Knows, Natioanl Underwriter v104n2 Jan. 10, 2000, 3 pages.*

(Continued)

*Primary Examiner*—Charles R. Kyle
(74) *Attorney, Agent, or Firm*—Rader Fishman & Grauer PLLC; Ronald P. Kananen

(57) ABSTRACT

An electronic money system terminates communication to a management center indistinguishably from a case in which the communication to the management center is completed within a predetermined period when it is impossible to complete the communication to the management center within the predetermined period. By switching an operation mode, a predetermined portable terminal is used instead of a communication line to upload and download data. When it is impossible to obtain data required for processing through the communication line, processing is performed based on data possessed up until that time.

20 Claims, 18 Drawing Sheets

U.S. PATENT DOCUMENTS

| | | | |
|---|---|---|---|
| 6,338,048 B1 * | 1/2002 | Mori .......................... | 705/41 |
| 6,993,508 B1 * | 1/2006 | Major et al. .................. | 705/51 |
| 7,024,390 B1 * | 4/2006 | Mori et al. ................... | 705/41 |
| 2002/0055908 A1 * | 5/2002 | Di Giorgio et al. ........... | 705/41 |

FOREIGN PATENT DOCUMENTS

| | | |
|---|---|---|
| EP | 0 700 024 A1 | 3/1996 |
| EP | 0 778 550 A2 | 6/1997 |
| EP | 0 810 564 A2 | 12/1997 |
| EP | 0 843 292 A2 | 5/1998 |
| EP | 0 416 916 A2 | 3/2001 |
| JP | 61-40669 A1 | 2/1986 |
| JP | 3-288236 A1 | 12/1991 |
| WO | WO 98 03943 A | 1/1998 |

OTHER PUBLICATIONS

Intellectual Property Office of Singapore; Dated Oct. 10, 2006.
European Search Report: Application No./Patent No. 01400335.4-1238: Dated: Jul. 2, 2007.
Austrian Search Report and Examination Report dated Mar. 14, 2003.

* cited by examiner

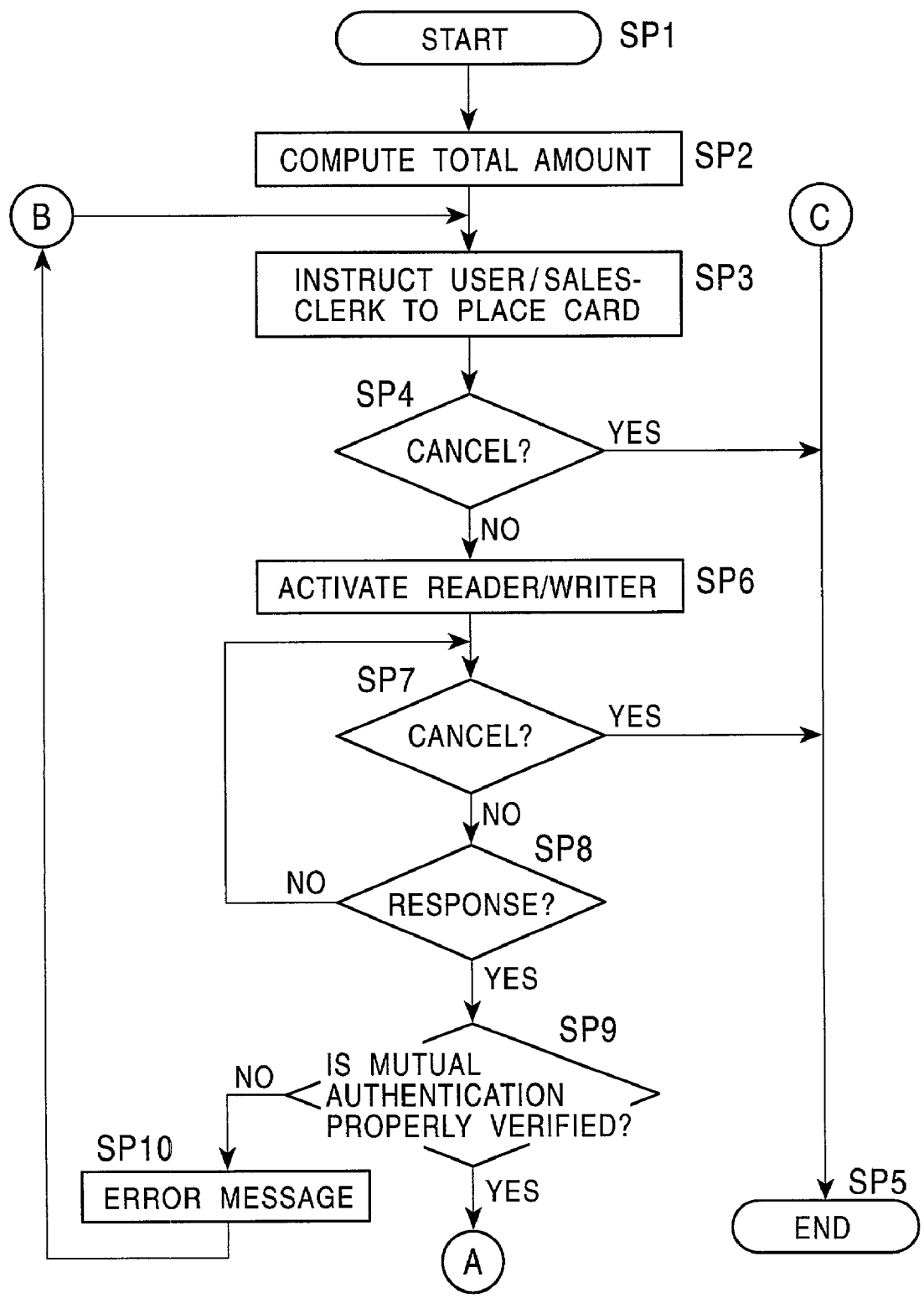

CARD BALANCE IS INSUFFICIENT.
ASK THE CUSTOMER IF HE/SHE
WISHES TO COMPLETE THE
TRANSACTION USING THIS CARD.

| TOTAL AMOUNT | ¥4,000 |
| --- | --- |
| OUTSTANDING AMOUNT | ¥4,000 |
| CARD BALANCE | ¥3,000 |

EXECUTE　　CANCEL

THERE ARE INSUFFICIENT FUNDS
AVAILABLE. DO YOU STILL WISH TO
COMPLETE THE TRANSACTION USING
THIS CARD?

| TOTAL AMOUNT | ¥4,000 |
| --- | --- |
| OUTSTANDING AMOUNT | ¥4,000 |
| CARD BALANCE | ¥3,000 |

ELECTRONIC MONEY SYSTEM AND ELECTRONIC MONEY TERMINAL

BACKGROUND OF THE INVENTION

1. Field of the Invention

The present invention relates to electronic money systems and to electronic money terminals, and the present invention can be applied to, for example, electronic money systems using contactless IC cards. When it is impossible to complete communication to a management center within a predetermined period of time, the communication is terminated indistinguishably from a case in which the communication to the management center is completed. Alternatively, by switching an operation mode, uploading and downloading are performed using a predetermined portable terminal unit in place of a communication line. When it is difficult to obtain data required for processing through a communication line, processing is performed based on data possessed up until that time. Therefore, when a line connected to the management center has a malfunction, it is possible to perform appropriate processing in spite of the malfunction.

2. Description of the Related Art

Hitherto, electronic money systems using portable information terminals held by users are available for use in some areas. In this type of system, electronic money is recorded on an IC card, that is, a portable information terminal, and when making a payment using the electronic money, the record on the IC card is updated by a terminal at a store, thus subtracting the payment amount from the electronic money on the IC card. The store terminal directly communicates the payment by the IC card to a management center, or the store terminal records the payment by the IC card and then communicates the payment to the management center. The payment is settled by the management center.

Concerning IC cards used in these electronic money systems, contact IC cards configured to be accessed by electrical connection through a contact and contactless IC cards configured to be accessed contactlessly such as by antenna coupling are available for use.

Among these IC cards, when a contactless IC card using antenna coupling is held near a reader/writer, which is a dedicated access unit, a radio-frequency signal transmitted from the reader/writer is induced in the antenna of the IC card, and the IC card is activated by power generated by the radio-frequency signal. In response to commands input through the radio-frequency signal from the reader/writer, the IC card transmits data stored in a memory thereof to the reader/writer. Using data output from the reader/writer, the content of the memory is updated.

Contactless IC cards provide higher reliability compared with contact IC cards since the former are contactless.

In electronic money systems, a store terminal may record, for example, payments made by IC cards in a hard disk drive or the like and may store the data. The store terminal may batch transmit the recorded data to the management center through public lines such as telephone lines.

In the case of uploading such data concerning payments, a line may have a malfunction.

Specifically, it may require an extremely long period of time to upload data due to the high line traffic. Furthermore, it may be difficult to establish a connection to the management center. In such cases, when a salesclerk performs uploading of these data after business hours and waits for the completion of the uploading before going home, the salesclerk may not be able to go home. At a store that is open 24 hours a day, processing of payments by electronic money tends to fall behind in a store terminal dedicated to performing uploading.

In this type of system, various data are encrypted and then transmitted/received. In view of preventing key data leakage, a terminal may delete the stored key data when power is turned off. In such a case, the terminal accesses the management center when power is turned on and obtains new key data.

When the system is configured in this manner, and when a line has a malfunction as described above, it becomes difficult to obtain key data or it requires a long period of time to obtain key data. In this way, the store terminal has difficulty in executing processing concerning electronic money.

SUMMARY OF THE INVENTION

Accordingly, it is an object of the present invention to provide an electronic money system and an electronic money terminal for performing appropriate processing when a line connected to a management center has a malfunction.

According to an aspect of the present invention, an electronic money system is provided including an electronic money terminal for updating the amount of electronic money in a portable electronic device that stores a value of the electronic money. The electronic money terminal includes a recorder for recording the updating of the electronic money. The electronic money system further includes a management section to which an update record for the updating of the amount of the electronic money is communicated through a communication line. The electronic money terminal further includes a communicating unit for batch communicating a plurality of update records recorded in the recorder to the management section and a terminating unit for terminating the communication to the management section indistinguishably from a case in which the communication to the management section is completed within a predetermined period when the communication is not completed within the predetermined period.

According to another aspect of the present invention, an electronic money transaction processing method is provided including a recording step of recording the updating of the amount of electronic money in a recording unit of an electronic money terminal. In a communicating step, a plurality of update records recorded in the recording unit is batch communicated to a management section through a communication line. In a terminating step, the communication to the management section is terminated indistinguishably from a case in which the communication is completed within a predetermined period when the communication to the management section is not completed within the predetermined period.

In the communicating step, a predetermined screen display may be provided. In the terminating step, when the communication to the management section is not completed within the predetermined period, the same screen display may be provided as that provided in a case in which the communication is completed within the predetermined period.

When the communication is not completed within the predetermined period, the update records may be uploaded by the management section by accessing the electronic money terminal.

According to another aspect of the present invention, an electronic money terminal is provided including an updating unit for updating the amount of electronic money recorded in a portable electronic device. A communicating unit communicates the updating of the amount of the electronic money to a management section through a communication line. A switching unit switches between the communication of the updating of the amount of the electronic money through the communication line and the recording of the updating of the electronic money in a portable electronic money terminal.

According to another aspect of the present invention, an electronic money terminal is provided including an updating unit for updating the amount of electronic money recorded in a portable electronic device. A communicating unit communicates the updating of the amount of the electronic money to a management section through a communication line. An obtaining unit obtains, through the communication line, at least the data required for electronic money processing. A switching unit switches between the obtaining of the data through the communication line and the obtaining of the data required for electronic money processing using a portable electronic money terminal.

The data required for electronic money processing may include data on invalid portable electronic devices.

The data required for electronic money processing may include key data required to communicate the updating of the electronic money to the management section.

According to another aspect of the present invention, an electronic money transaction processing method is provided including a determining step of comparing a payment amount with the amount of credited electronic money and determining whether the amount of the credited electronic money is sufficient to pay the payment amount. In a menu providing step, when it is determined in the determining step that the payment amount exceeds the credited amount, a menu is provided allowing execution and cancellation of the payment transaction using the electronic money.

According to another aspect of the present invention, an electronic money transaction processing method is provided including a determining step of comparing a payment amount with the amount of credited electronic money and determining whether the amount of the credited electronic money is sufficient to pay the payment amount. In a setting step, when it is determined in the determining step that the payment amount exceeds the credited amount, an amount to be paid using the electronic money is set in accordance with payment terms. In an updating step, the amount to be paid using the electronic money, which has been set in the setting step, is subtracted from the credited amount.

The payment terms include terms allowing the giving of change in preset currency units. The amount to be paid using the electronic money may be obtained by rounding down the amount of the electronic money to a preset currency unit.

The payment terms may include terms allowing a predetermined input unit to input the amount to be paid using the electronic money.

According to another aspect of the present invention, an electronic money transaction processing method is provided including a first instructing step of instructing a portable electronic device that stores a value of electronic money to update the amount of the electronic money. In a communicating step, in response to communication from the portable electronic device that the updating is completed, the updating of the electronic money is communicated to a management section for managing the updating of the electronic money.

In a second instructing step, subsequent to the first instructing step, the updating of the electronic money may be instructed when the completion of the updating is not communicated from the portable electronic device.

According to another aspect of the present invention, an electronic money transaction processing method is provided including an updating step of updating the amount of electronic money stored in a portable electronic device that stores a value of the electronic money. In a communicating step, the updating of the electronic money is communicated to a management section. In a canceling step, the updating of the amount of the electronic money and the communication of the updating of the electronic money to the management section are canceled by a predetermined operation.

The canceling of the processing by the predetermined operation may be accepted until the portable electronic device is instructed to update the amount of the electronic money. The canceling of the processing by the predetermined operation may not be accepted within the period from the time at which the portable electronic device is instructed to update the amount of the electronic money to the time at which the completion of the updating is communicated from the portable electronic device. When the completion of the updating is communicated, the updating of the electronic money can be communicated to the management section.

Subsequent to the cancellation of making a payment using the electronic money, the payment can be made by cash.

According to another aspect of the present invention, an electronic money transaction processing method is provided including an updating step of subtracting part of a payment amount from a portable electronic device that stores a value of electronic money and updating the amount of the electronic money stored in the portable electronic device. In a communicating step, the partially-paid amount is communicated to an external unit. Alternatively, the amount partially paid using the electronic money is subtracted from the payment amount, and the outstanding amount is communicated to the external unit.

The payment amount may be obtained from the external unit.

The external unit may include a cash accounting machine.

In the updating step, the full amount of the electronic money stored in the portable electronic device may be used to pay the amount to be paid using the electronic money.

In the updating step, the amount of the electronic money in the portable electronic device may be updated, and update information may be communicated to a management section.

According to the present invention, when it is impossible to complete communication to a management section within a predetermined period, the communication to the management section is terminated indistinguishably from a case in which the communication to the management section is completed within the predetermined period. Alternatively, by switching an operation mode, a predetermined portable terminal unit is used instead of a communication line to upload and download data. When it is difficult to obtain data required for processing through a communication line, processing is performed based on data possessed up until that time. Therefore, when a line connected to the management section has a malfunction, it is possible to perform appropriate processing in spite of the malfunction.

BRIEF DESCRIPTION OF THE DRAWINGS

FIG. 5 is a flowchart showing a process for performing a transaction using the store terminal shown in FIG. 3;

FIGS. 9A and 9B are plan views of display screens of the store terminal shown in FIG. 3 when there are insufficient funds available to complete a payment;

DESCRIPTION OF THE PREFERRED EMBODIMENTS

The present invention will be understood from the following description of the preferred embodiments with reference to the accompanying drawings.

(1) Overall Configuration of Electronic Money System

Figure 1:
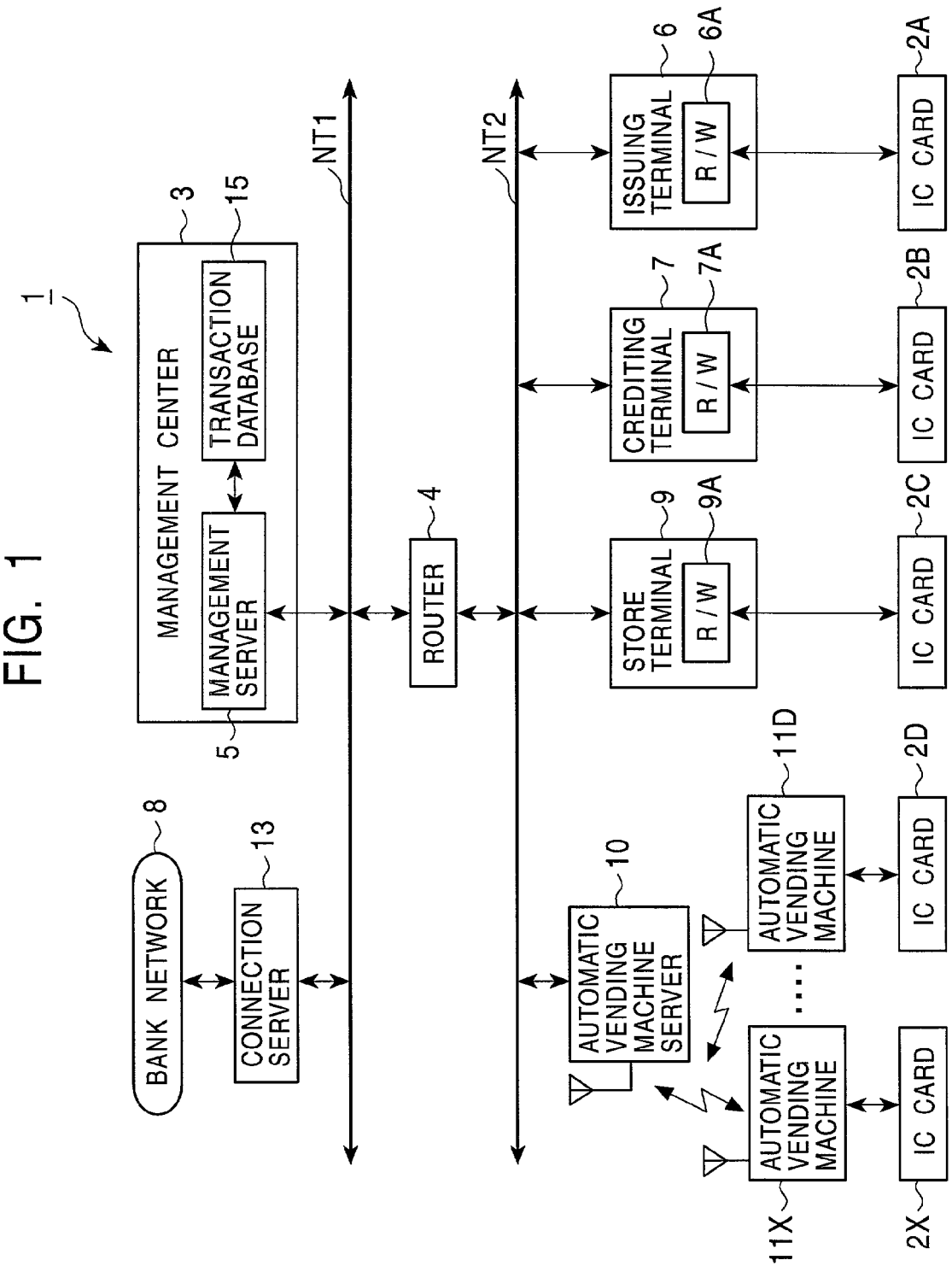
FIG. 1 is a block diagram of an electronic money system according to an embodiment of the present invention.

FIG. 1 is a block diagram of an electronic money system according to an embodiment of the present invention. An electronic money system 1 uses contactless IC cards 2A to 2X. The electronic money system 1 uses a closed loop system in which a management center 3 performs centralized control of the use of the IC cards 2A to 2X held by users. The electronic money system 1 is formed by connecting a management server 5 provided at the management center 3 to various servers and to terminals through networks NT1 and NT2 formed of leased lines and public lines, a router 4, and the like.

In the electronic money system 1, data communication among the terminals, the servers, and the like is performed using encryption which appropriately uses a system key shared among units within the electronic money system 1, mutual authentication keys used to verify mutual authentication among units, a verification key used to confirm a signature of a data source, and the like. A description of the encryption processing is omitted hereinafter in order to simplify the description.

Among these servers and the terminals, an issuing terminal 6 is provided at, for example, a window of a predetermined IC card issuing entity or the like and performs issuing processing of the IC cards 2A to 2X. Specifically, the issuing terminal 6 is always online-connected to the management center 3 during business hours and gains access to the IC card 2A using a reader/writer (R/W) 6A in accordance with data exchanged with the management center 3. In doing so, the issuing terminal 6 reserves a memory space in the IC card 2A, which is required for processing electronic money, and records key data.

When power is turned off at the end of window transactions or the like, the issuing terminal 6 deletes data which can be utilized for illegally issuing the IC card 2A, the data including key data used to exchange data with the management center 3 and key data used to exchange data with the IC card 2A, from the record in an internal recorder. This prevents illegal leakage of these data and ensures the security of the system.

When power is turned on at the beginning of window transactions or the like, the issuing terminal 6 reserves a line to the management center 3 and downloads the data, which are deleted when power is turned off, from the management center 3. The issuing terminal 6 performs IC card issuing processing for the day using the downloaded data.

A crediting terminal 7 is provided at a financial institution or the like and performs processing to charge the IC card 2B with electronic money. Specifically, the crediting terminal 7 is of substantially the same shape as an automatic cash dispenser provided at a financial institution or the like. The crediting terminal 7 gains access to the IC card 2B using a reader/writer 7A in accordance with data exchanged with a bank network 8 which operates in response to user operation. In doing so, the crediting terminal 7 records electronic money on the IC card 2B, which is drawn on a user's account. The crediting of the electronic money to the IC card 2B is communicated by the crediting terminal 7 to the management center 3.

When power is turned off at the end of window transactions or the like, the crediting terminal 7 deletes data which may be utilized for illegally using the IC card 2A, the data including key data used to exchange data with the bank network 8 and key data used to exchange data with the IC card 2B, and data which prevents the illegal use of IC cards, such as an invalidity list described below, from the record in an internal recorder. This prevents illegal leakage of these data and ensures the security of the system.

When power is turned on at the beginning of window transactions or the like, the crediting terminal 7 reserves a line to the management center 3 and downloads the data, which are deleted when power is turned off, from the management center 3. The crediting terminal 7 performs crediting processing for the day using the downloaded data.

When downloading the data, the crediting terminal 7 obtains an invalidity list, which is a list of IC cards which are prohibited from being used. The crediting terminal 7 performs the crediting processing for the day in accordance with the invalidity list. When the IC card 2B concerning the crediting is included in the invalidity list, the crediting terminal 7 cancels the crediting processing and communicates this to the management center 3.

A store terminal 9 is provided at each store to which the electronic money system 1 is applied and processes payments using electronic money. In response to operation by a salesclerk or the like, the store terminal 9 gains access to the IC card 2C using a reader/writer 9A and subtracts the payment amount from the electronic money on the IC card 2C. In addition, the store terminal 9 records the payment using the electronic money on the IC card 2 and communicates the payment record to the management center 3 at a predetermined time. The payment record includes the identification code of the IC card concerning the electronic money, the payment amount, the payment date, and the like. Payment records are arranged into a database and are recorded at the store terminal 9.

When updating the amount of electronic money in this manner, the store terminal 9 refers to the invalidity list issued by the management center 3. If the IC card 2C concerning the payment is included in the invalidity list, the store terminal 9 cancels the payment processing. Furthermore, the store terminal 9 records a series of these processes and communicates, to the management center 3, these processes in addition to the record of payment using electronic money.

Automatic vending machines 11D to 11X vend bottled drinks desired by users in accordance with user operations. The automatic vending machines 11D to 11X gain access to the respective IC cards 2D to 2X using respective internal reader/writers in accordance with user operations and subtract the respective amounts purchased by the users from the electronic money on the IC cards 2D to 2X. Furthermore, the automatic vending machines 11D to 11X record the use of electronic money by the respective IC cards 2D to 2X and communicates these records to an automatic vending machine server 10.

When updating the amount of electronic money in this manner, the automatic vending machines 11D to 11X refer to the invalidity list issued by the management center 3. If the IC card 2C concerning the payment is included in the invalidity list, the payment processing is cancelled.

The automatic vending machine server 10 records the use of electronic money at the automatic vending machines 11D to 11X and communicates these records to the management center 3 at a predetermined time. Specifically, using wireless communication with the automatic vending machines 11D to 11X, the automatic vending machine server 10 records payments made by electronic money at the automatic vending machines 11D to 11X and batch communicates the use of electronic money at the automatic vending machines 11D to 11X to the management center 3. When communicating data to the management center 3, the automatic vending machine server 10 downloads an invalidity list and communicates the downloaded invalidity list to the automatic vending machines 11D to 11X.

In general, the automatic vending machine server 10 is maintained in a state in which power is continuously supplied. When power is turned off, the automatic vending machine server 10 deletes data which may be utilized for illegally using the IC card 2A, the data including key data used to exchange data with the management center 3 and key data used to exchange data with each of the automatic vending machines 11D to 11X, and data which prevents the illegal use of IC cards, such as an invalidity list described below, from the record in an internal recorder. This prevents illegal leakage of these data and ensures the security of the system.

When power is turned on, the automatic vending machine server 10 reserves a line to the management center 3 and downloads the data, which are deleted when power is turned off, from the management center 3. The automatic vending machine server 10 performs various processes using the downloaded data.

When downloading the data, the automatic vending machine server 10 also obtains an invalidity list, which is a list of IC cards which are prohibited from being used, and performs various processes in accordance with the invalidity list.

Concerning the issuing terminal 6, the crediting terminal 7, the store terminal 9, the automatic vending machine server 10, and the automatic vending machines 11A to 11X, key data used to perform encryption, to confirm a signature, to verify mutual authentication are periodically updated by exchanging data with the management server 5. In response to such updates or instructions from the management server 5, the crediting terminal 7, the store terminal 9, and the automatic vending machines 11A to 11X update key data used for encryption on the IC cards 2B to 2X, which are used to credit electronic money and to make payments. The security of the electronic money system 1 is thus ensured by these processes.

The bank network 8 is connected to the electronic money system 1 through a connection server 13. The bank network 8 manages accounts of users who use the IC cards 2A to 2X, respectively. Specifically, when the crediting of electronic money to the IC card 2B is communicated from the crediting terminal 7 to the bank network 8, the bank network 8 checks the user's account, which is the source of the electronic money crediting. The bank network 8 determines whether electronic money can be credited and communicates the determination result to the crediting terminal 7. In accordance with a response from the crediting terminal 7 in response to the communication of the determination result, the crediting amount is deducted from the corresponding account to a predetermined management account. The bank network 8 communicates the result to the crediting terminal 7. In response to a settlement instruction given from the management center 3, the cash temporarily pooled in the management account is allocated to an account of each store at which the user has made payment using electronic money.

The connection server 13 connects the electronic money system 1 and the bank network 8. The connection server 13 performs processes such as decryption and encryption in accordance with each system of data exchanged between the electronic money system 1 and the bank network 8.

The management center 3 manages and controls the electronic money system 1 using the management server 5 in accordance with records in a transaction database 15. Specifically, the transaction database 15 is formed by recording, with respect to the IC cards 2A to 2X which are managed and controlled by the electronic money system 1, identification data of each of the IC cards 2A to 2X, personal data, electronic money-use history of each of the IC cards 2A to 2X, balance figure, and the like.

In response to issuing instructions for issuing the IC card 2A from the issuing terminal 6, the management server 5 exchanges various data required to issue the IC card 2A with the issuing terminal 6 and stores a record concerning the issuing in the transaction database 15. When the crediting of electronic money to the IC card 2B is communicated from the crediting terminal 7 to the management center 3, the management center 3 updates the record in the transaction database 15. When the store terminal 9 and the automatic vending machine server 10 communicates the use of electronic money to the management center 3, the management server 3 updates the record for the corresponding IC card.

For example, on a predetermined day each month, the management server 5 gains access to the transaction database 15 and computes the amount to be allocated to each store based on the use history of each IC card used that month. The management server 5 instructs the bank network 8 to settle up these amounts.

The management server 5 creates an invalidity list based on inputs from terminals provided at the management center 3 and comparison between the payment amount and the balance figure of each IC card, which is recorded in the transaction database 15, and maintains the created invalidity list. The management server 5 distributes the invalidity list to the crediting terminal 7 in real time. The management server 5 also distributes the invalidity list to the store terminal 9 and the automatic vending machine server 10 when the management server 5 is accessed by the store terminal 9 and the automatic vending machine server 10.

When the issuing terminal 6 and the crediting terminal 7 are turned on and gain access to the management server 5, the management server 5 transmits the invalidity list and key data used to exchange data with these terminals. In response to operations by an operator, the management server 5 updates key data used to exchange data with these terminals at a predetermined time and communicates the updated key data and the invalidity list to each terminal. The key data is transmitted to the issuing terminal 6 in real time since the issuing terminal 6 is always connected.

(2) Store Terminal

Figure 2:
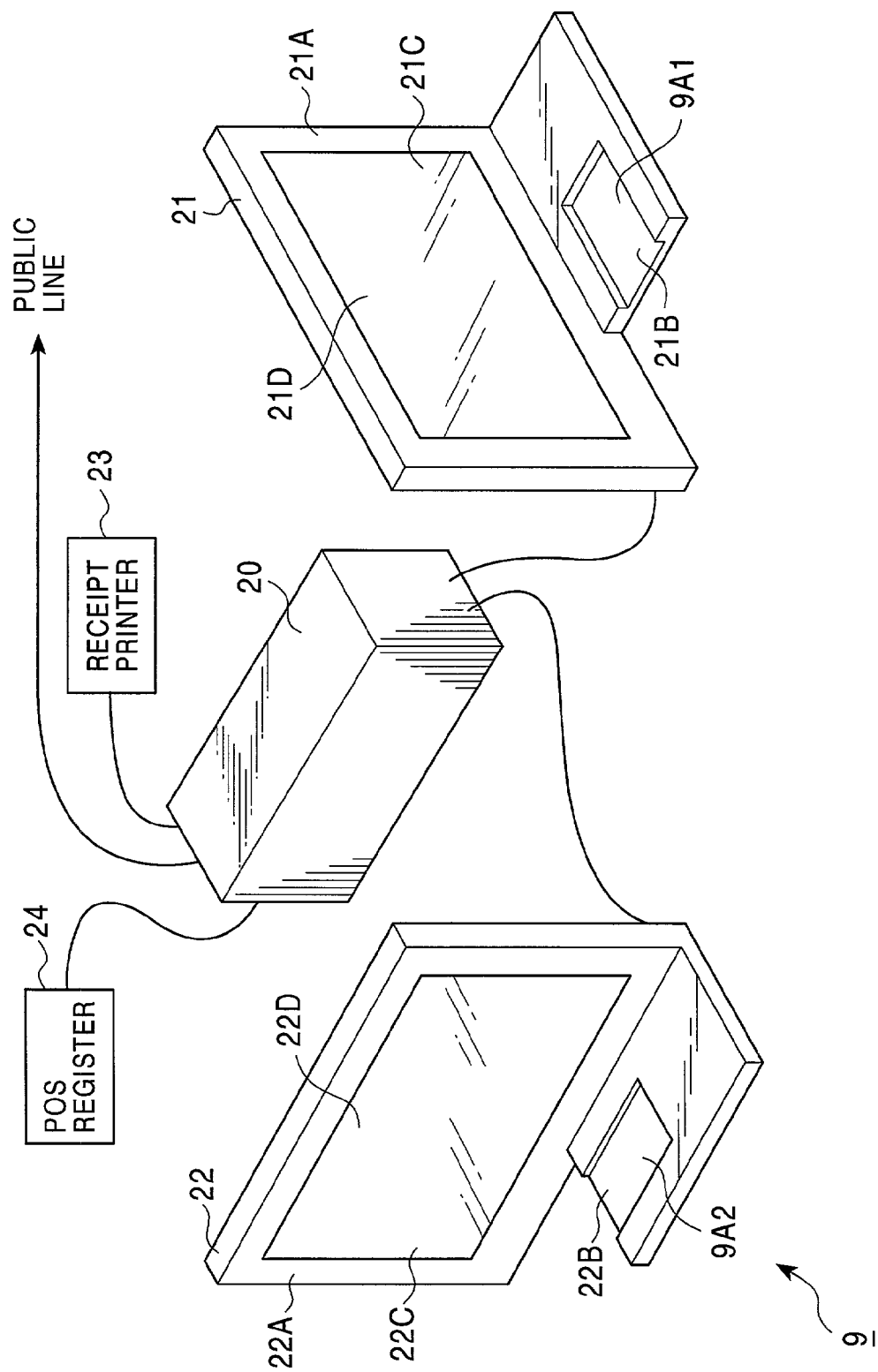
FIG. 2 is a perspective view of a store terminal in the electronic money system shown in FIG. 1.

FIG. 2 is a perspective view of the store terminal 9. The store terminal 9 includes a terminal main unit 20 to which a customer operation unit 21 and a store operation unit 22 are connected. As circumstances demand, a receipt printer 23 and a point-of-sales (POS) register 24 can be connected to the store terminal 9. The receipt printer 23 is used to issue receipt particulars, receipts, and the like. The POS register 24 is an accounting machine used to receive/pay money by cash in which a unit price concerning a payment can be input by reading bar code or the like. The store terminal 9 can transmit/receive a payment amount or the like to/from the POS register 24 by transmitting/receiving unencrypted data as circumstances demand or by transmitting/receiving encrypted data.

The customer operation unit 21 is provided with, in front of a liquid crystal display 21A, a card presentation holder 21B on which an IC card is to be placed. The card presentation holder 21B has a concave portion corresponding to the shape of an IC card. Underneath the concave portion is a reader/writer 9A1. When an IC card is placed on the card presentation holder 21B of the customer operation unit 21, an antenna of the reader/writer 9A1 and an antenna of the IC card are reliably coupled, thus enabling the reader/writer 9A1 to gain access to the IC card.

The liquid crystal display 21A is provided with a display screen 21C at the side of the card presentation holder 21B, and a touch panel 21D is provided on the display screen 21C. Therefore, the customer operation unit 21 can provide various pieces of information to a user who places the IC card on the card presentation holder 21B. Furthermore, various pieces of information can be input by operations on the display screen 21C.

The store operation unit 22 is similarly provided with a card presentation holder 22B in front of a liquid crystal display 22A. Beneath a concave portion of the card presentation holder 22B is a reader/writer 9A2. Accordingly, when an IC card submitted by a user is placed on the card presentation holder 22B of the store operation unit 22, the reader/writer 9A2 gains access to the IC card.

The liquid crystal display 22A is provided with a display screen 22C at the side of the card presentation holder 22B. On the display screen 22C, a touch panel 22D is provided. Accordingly, the store operation unit 22 provides a salesclerk who places the IC card on the card presentation holder 22B with various pieces of information. Furthermore, various pieces of information can be input by operations on the display screen 22C.

The terminal main unit 20 includes, in a substantially rectangular housing, interfaces with the customer operation unit 21, the store operation unit 22, the receipt printer 23, and the POS register 24, a controller, and the like.

Figure 3:
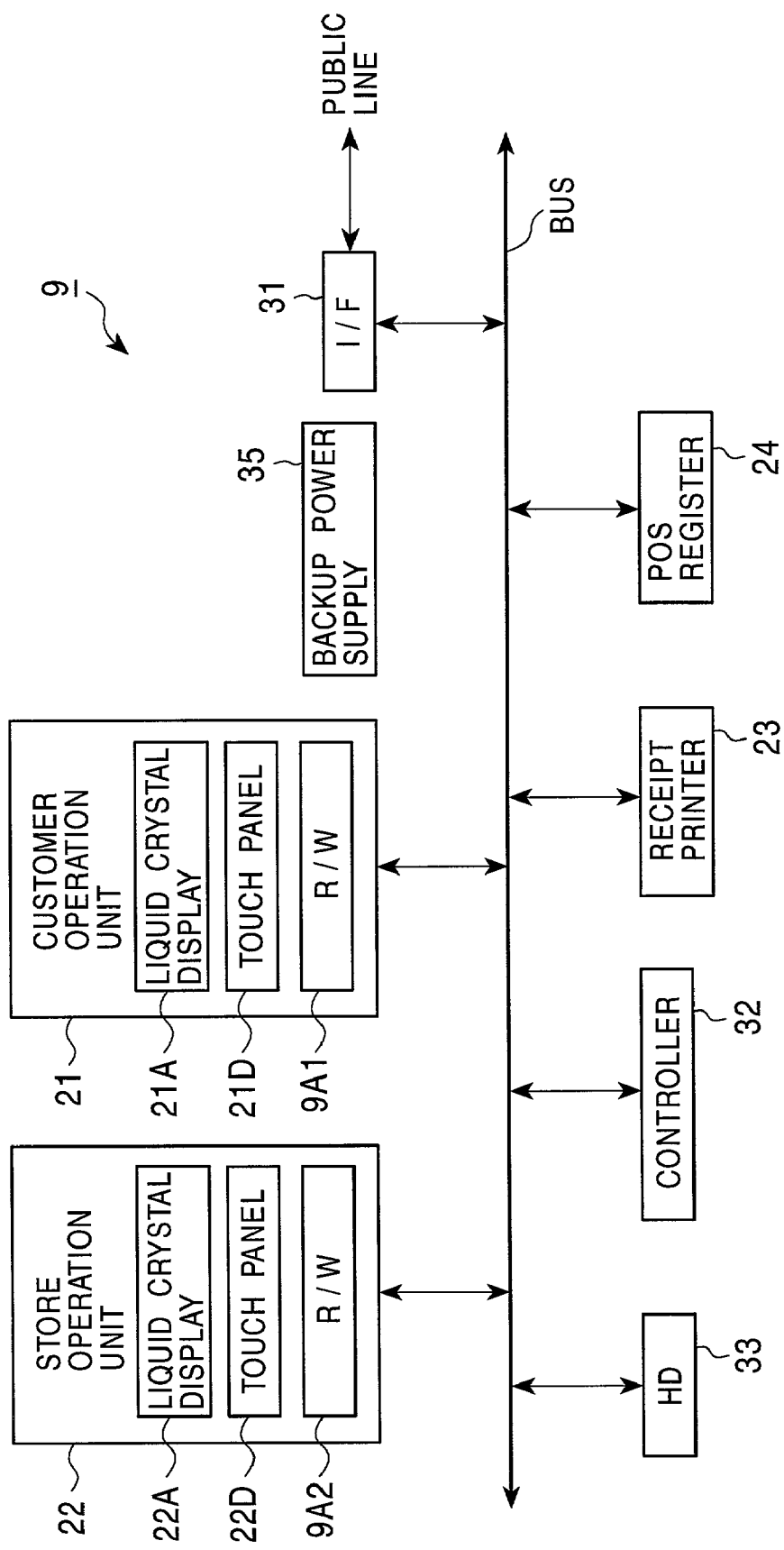
FIG. 3 is a block diagram of the store terminal in the electronic money system shown in FIG. 1.

FIG. 3 is a block diagram of the store terminal 9. Concerning the store terminal 9, the customer operation unit 21, the store operation unit 22, the receipt printer 23, and the POS register 24 are connected to an internal bus BUS through interfaces (not shown). An interface (I/F) 31 is connected to the bus BUS. Under the control of a controller 32, the interface 31 inputs and outputs various data to and from the management center 3 through a public line. Accordingly, the store terminal 9 uploads various data to the management center 3 and obtains an invalidity list and the like.

A hard disk drive (HD) 33 records, under the control of the controller 32, various data obtained through the interface 31 and various data required for processing by the controller 32, such as data concerning payments by electronic money.

A backup power supply 35 supplies backup power using internal batteries when the commercial power supply is cut off.

The controller 32 is formed of an arithmetic processing unit for controlling the overall operation of the store terminal 9. The controller 32 controls the overall operation in accordance with processes recorded in the hard disk drive 33 in response to communication by the customer operation unit 21 and the store operation unit 22. Accordingly, the controller 32 processes a payment by electronic money and issues a receipt by activating the receipt printer 23.

In other words, when the store terminal 9 is turned on by a salesclerk, the controller 32 displays a predetermined startup mode selection screen on the store operation unit 22. The startup mode selection screen is a menu screen which enables the salesclerk to select an operation mode of the store terminal 9. The controller 32 displays a sales mode menu and a practice mode menu on the menu screen. The practice mode is an operation mode for allowing the salesclerk to practice the operation of the store terminal 9. In contrast, the sales mode is a mode for actually processing a payment by electronic money or the like.

When the sales mode is selected on the menu screen, the controller 32 initializes an internal memory or the like and displays a startup password input screen. When a pre-input startup password is input by operating the touch panel 22D provided on the store operation unit 22, the controller 32 switches the operation mode to a transaction mode, and the customer operation unit 21 and the store operation unit 22 are switched to display the transaction mode. The transaction mode is a mode for processing electronic payments using electronic money.

When the touch panel 22D provided on the store operation unit 22 is operated by a salesclerk by pressing a predetermined area on the display screen in the transaction mode, the display of the store operation unit 22 is switched to a management password input screen. When a pre-input management password is input by operating the touch panel 22D provided on the store operation unit 22, the controller 32 switches the operation mode to a totaling mode, and the display of the store operation unit 22 is switched to the corresponding display screen. The totaling mode is an operation mode for totaling the sales by electronic money.

When the touch panel 22D provided on the store operation unit 22 is operated by a salesclerk by pressing a predetermined area on the display screen in the totaling mode, the display of the store operation unit 22 is switched to a registration mode input screen. The registration mode is a mode for registering operation modes of the store terminal 9 and the like.

On the registration mode input screen, the controller 32 accepts settings such that a receipt will be printed for every transaction or a receipt will be printed only when a predetermined operation is performed using the touch panel 22D. In addition, the controller 32 accepts settings such that payments by electronic money are processed in cooperation with the POS register 24 or payments by electronic money are processed by operation independent of the POS register 24. Furthermore, settings and changes of the startup password and the management password, registration of a consumption tax, and the like are accepted. When a predetermined area of the touch panel 22D is pressed on the registration mode input screen, the controller 32 switches, in accordance with the operation, the operation mode among the totaling mode, the transaction mode, and a standby mode in which a power supply cutoff is awaited. Also, the display of the store operation unit 22 is switched to the corresponding display.

When a predetermined area of the touch panel 22D is similarly pressed in the totaling mode or the transaction mode, the controller 32 switches the operation mode to the transaction mode or to the standby mode, respectively. When a predetermined area of the touch panel 22D is similarly pressed in the standby mode, the controller 32 cuts off the power supply to the store terminal 9.

(3) Electronic Money Transaction

Figure 4A:
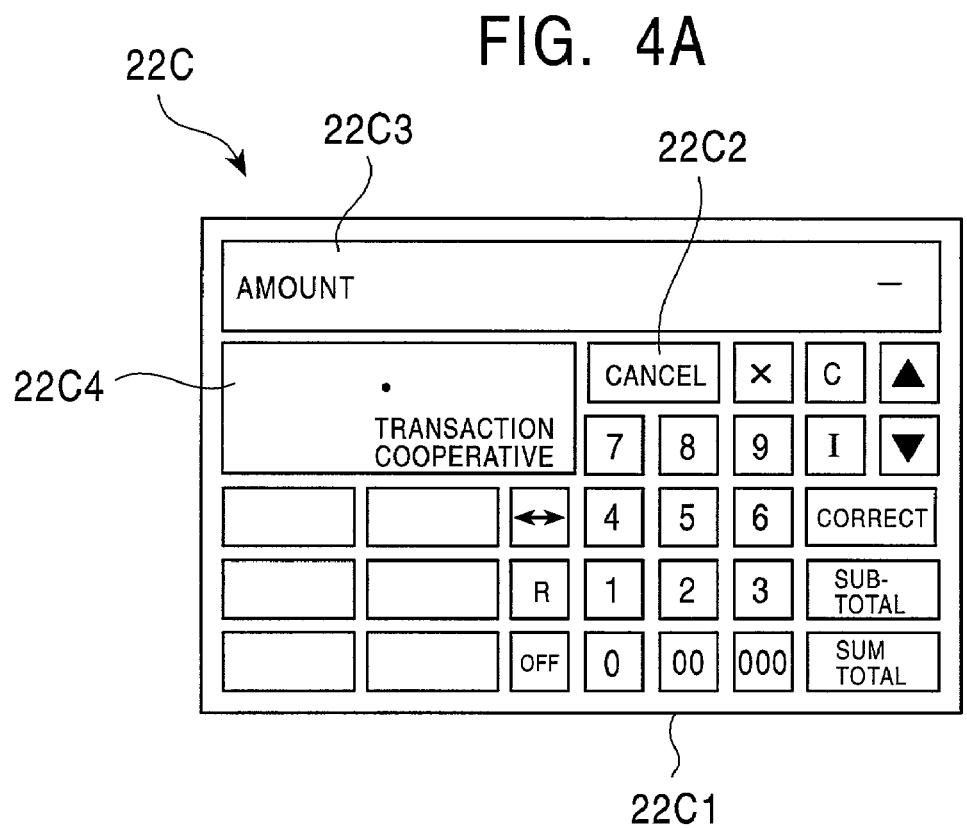
FIGS. 4A and 4B are plan views of display screens of the store terminal shown in FIG. 3.
Figure 4B:
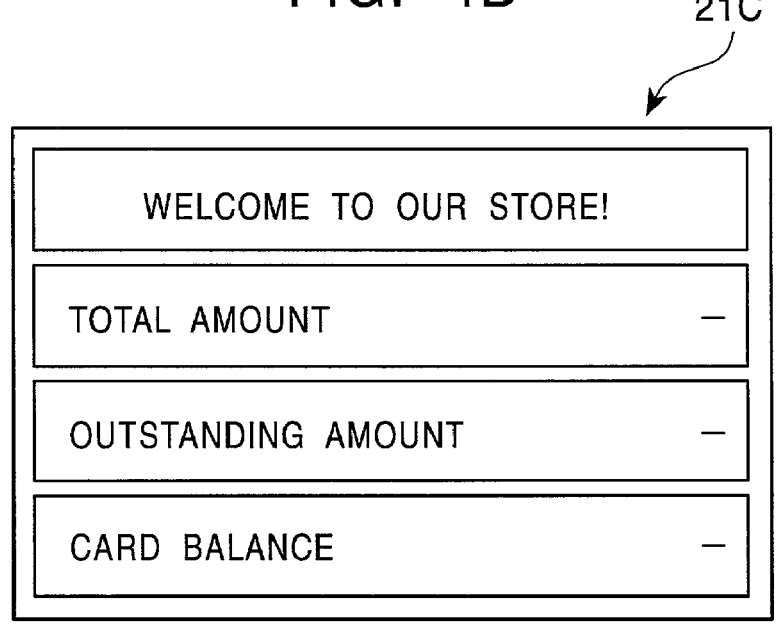

When the operation mode is set to the transaction mode, the controller 32 causes the customer operation unit 21 and the store operation unit 22 to display corresponding display screens. FIG. 4A shows the display screen 22C of the store operation unit 22. The display screen 22C includes a menu 22C1 including a numeric keypad required to input an amount of money, a subtotal key, a sum total key, and a correction key, a cancel key 22C2, a display area 22C3 for displaying a total amount, a display area 22C4 for displaying an amount being input, and the like. FIG. 4B shows the display screen 21C of the customer operation unit 21. On the display screen 21C, a message to a user is displayed at the top, followed by a total amount display area, an outstanding amount display area, and a card balance display area.

Figure 6:
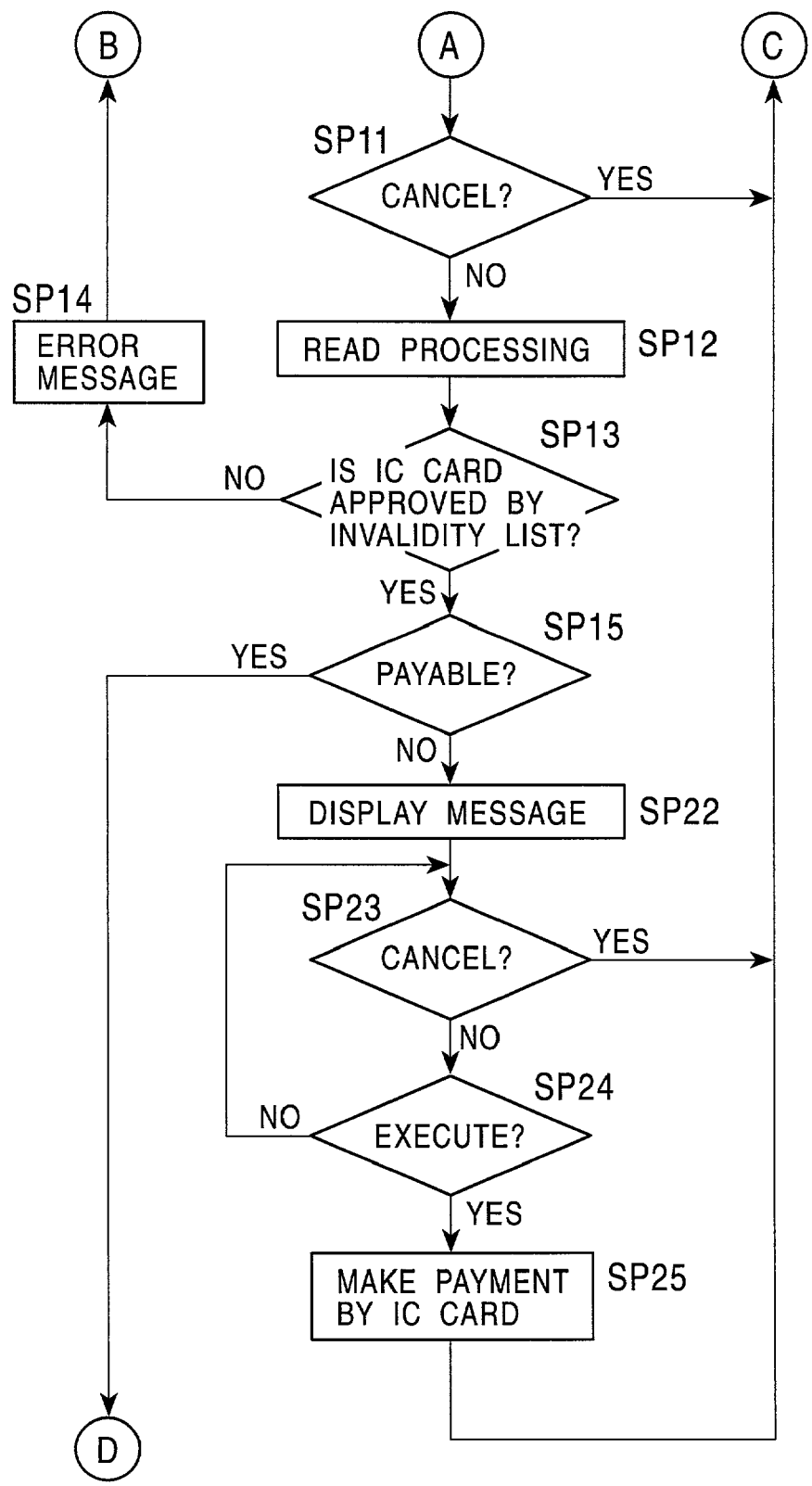
FIG. 6 is a flowchart showing processing steps subsequent to the flowchart shown in FIG. 5.
Figure 7:
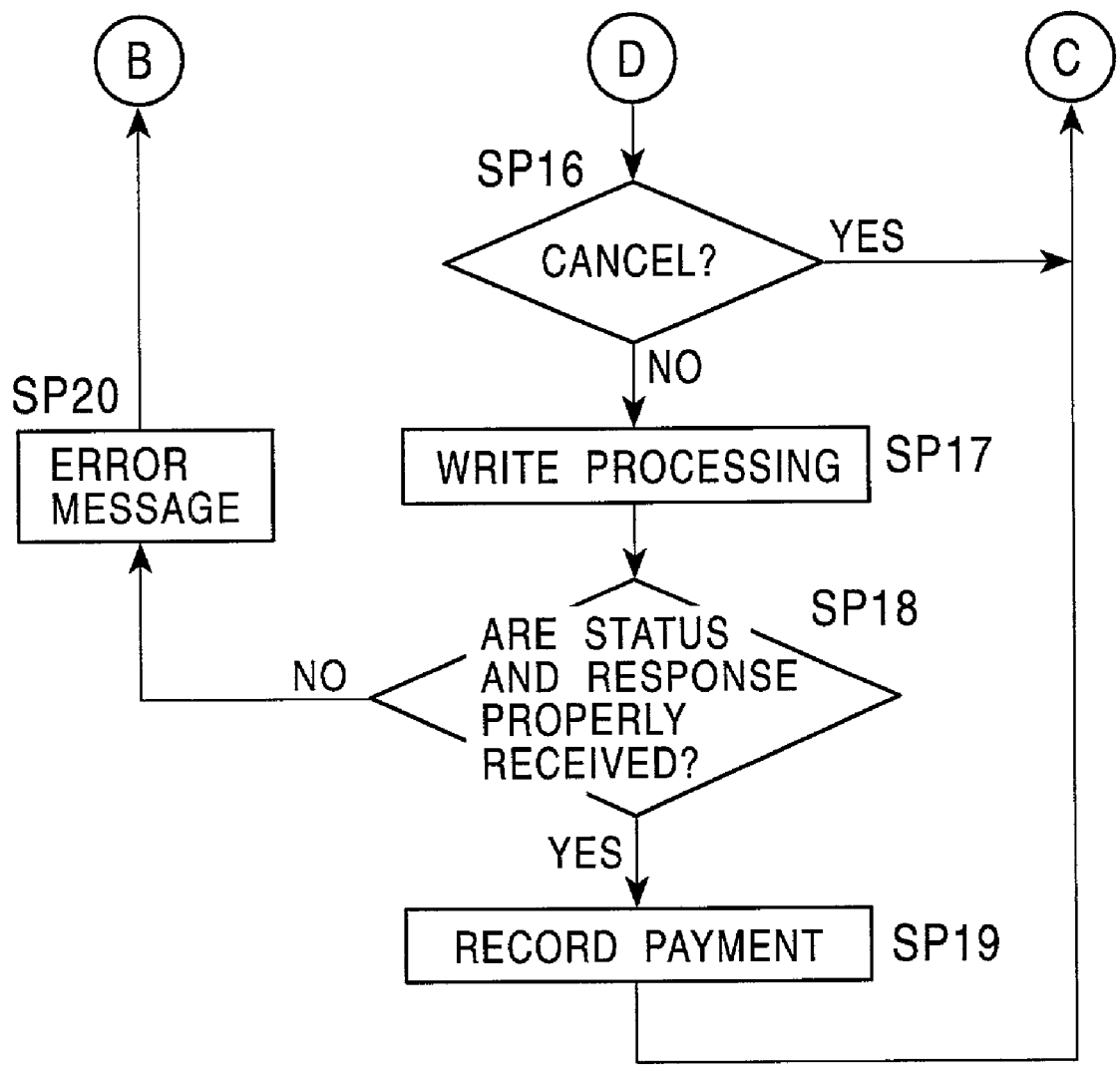
FIG. 7 is a flowchart showing processing steps subsequent to the flowchart shown in FIG. 6.

After the controller 32 has set the customer operation unit 21 and the store operation unit 22 in this manner, the controller 32 processes a payment using electronic money by executing a process shown in FIGS. 5 to 7. Specifically, the controller 32 moves from step SP1 to step SP2 and computes a payment amount for a user. In accordance with an operation of the touch panel 22D of the store operation unit 22, the controller 32 accepts inputs of payment amounts one after another and computes a total payment amount. While doing so, the controller 32 appropriately displays a subtotal amount and a sum total amount on the display screen 21C of the customer operation unit 21. When the cancel key (FIG. 4A) is pressed by a salesclerk, the process is temporarily halted, and a correction to the amount by the salesclerk is accepted.

When the payment amounts are totaled in this manner, the controller 32 moves to step SP3 and instructs the user or the salesclerk to place an IC card on one of the card presentation holders 21B and 22B. The controller 32 displays, instead of the message "Welcome to our store!" on the display screen 21C of the customer operation unit 21 shown in FIG. 4A, the message "Please place the card", thus instructing the user to place the IC card.

In step SP4, the controller 32 determines whether the cancel key 22C2 has been pressed by the salesclerk. Although the user has selected to pay by electronic money, the user may change this so as to pay by cash or by credit card. In such a case, the cancel key 22C2 is pressed. The payment amounts may be incorrectly totaled. In such a case, the cancel key 22C2 is also pressed. When the cancel key 22C2 is pressed, the controller 32 moves from step SP4 to step SP5, terminates the process, and returns to the initial state of the transaction mode.

In contrast, when the cancel key 22C2 is not pressed, the controller 32 moves to step SP6 and activates the reader/writer 9A1 or 9A2. In step SP7, the controller 32 determines whether the cancel key 22C2 has been pressed. If the determination is affirmative, the controller 32 moves from step SP7 to step SP5, terminates the process, and returns to the initial state of the transaction mode. In contrast, when the determination in step SP7 is negative, the controller 32 moves to step SP8 and determines whether a response from the IC card has been received. If the determination is negative, the controller 32 returns to step SP7.

When the reader/writer 9A1 or 9A2 is activated by the controller 32, the reader/writer 9A1 or 9A2 communicates with the IC card at predetermined periods. When the IC card is placed on the card presentation holder 21B or 22B, a radio-frequency signal in response to the communication from the reader/writer 9A1 or 9A2 is induced in an antenna of the IC card, and the IC card is activated by power generated by the radio-frequency signal. The IC card analyzes data transmitted by the radio-frequency signal. Since the transmitted data in this case is concerned with the communication from the reader/writer 9A1 or 9A2, the IC card makes a response to the communication. When the reader/writer 9A1 or 9A2 receives the response, the reader/writer 9A1 or 9A2 stops communicating with the IC card and communicates to the controller 32 that the response is received.

After the controller 32 has activated the reader/writer 9A1 or 9A2, the controller 32 repeats steps SP7-SP8-SP7 until the IC card is placed on the card presentation holder 21B or 22B and the response is detected. When the cancel key 22C2 is pressed by the salesclerk, the process is immediately terminated. When a predetermined period of time has elapsed while repeating steps SP7-SP8-SP7, the controller 32 displays a message on the store operation unit 22 that it is waiting for an IC card to be placed. For example, when the process is interrupted and remains in that state, the controller 32 prompts the user or the salesclerk to continue with the process.

In contrast, when the IC card is placed and the response is detected, the controller 32 is communicated from the reader/writer 9A1 or 9A2 and moves to step SP9. The controller 32 instructs the reader/writer 9A1 or 9A2 that has detected the response to verify mutual authentication. As shown in FIG. 7, the reader/writer 9A1 or 9A2 transmits and receives predetermined data to and from the IC card using a mutual authentication key, thus verifying mutual authentication. At the same time, the reader/writer 9A1 or 9A2 communicates the processing result to the controller 32.

Based on the mutual authentication result communicated from the reader/writer 9A1 or 9A2, the controller 32 determines whether the mutual authentication is correctly verified, that is, whether the placed IC card is for use in the electronic money system 1. In other words, the user may have instead happened to place an IC card such as a commuter pass by mistake. If the determination is negative, the controller 32 moves to step SP10. The controller 32 causes the customer operation unit 21 and the store operation unit 22 to display a message indicating that an incorrect IC card has been placed and returns to step SP3. The controller 32 again prompts the user to place the IC card. As circumstances demand, a canceling operation by the salesclerk is accepted.

If the mutual authentication is correctly verified, the controller 32 moves to step SP11 (FIG. 6) and again determines whether the cancel key 22C2 has been pressed. If the determination is affirmative, the controller 32 moves from step SP11 to step SP5 (FIG. 5), terminates the process, and returns to the initial state of the transaction mode. In contrast, if the determination in step SP11 is negative, the controller 32 moves to step SP12 and instructs the reader/writer 9A1 or 9A2 to transmit a read command.

Referring to FIG. 7, in response to the instruction, the reader/writer 9A1 or 9A2 transmits to the IC card a read command (Read) concerning an address (Adr) designated by the controller 32. When the IC card properly receives the read command (Read), the IC card sends an acknowledgement status ACK to the reader/writer 9A1 or 9A2. Subsequently, the IC card executes the read command and transmits to the reader/writer 9A1 or 9A2 data recorded in a memory as a response Response. When the reader/writer 9A1 or 9A2 receives the data in the form of a response, the reader/writer 9A1 or 9A2 communicates the data to the controller 32. In response to this communication by the reader/writer 9A1 or 9A2, the controller 32 obtains the balance figure of electronic money recorded on the IC card, the identification code of the IC card, and the like.

When the controller 32 reads the desired data from the IC card in this manner, the controller 32 moves to step SP23. The controller 32 searches for an invalidity list using the read identification code of the IC card and determines whether the use of this IC card is prohibited. If the use of the IC card is prohibited, the controller 32 moves to step SP14. The controller 32 switches the displays of the customer operation unit 21 and the store operation unit 22 and informs the user and the salesclerk of the fact that the use of the placed IC card is prohibited. Subsequently, the controller 32 returns to step SP3.

In contrast, if the use of the IC card is not prohibited, the controller 32 moves to step SP15. By comparing the electronic money balance figure read from the IC card and the total payment amount, the controller 32 determines whether the total payment amount is payable using the electronic money on the IC card.

If there are sufficient funds available, the controller 32 moves from step SP15 to step SP16 (FIG. 7) and again determines whether the cancel key 22C2 has been pressed. If the determination is affirmative, the controller 32 moves from step SP17 to step SP5 (FIG. 5). In this way, even when there are sufficient funds available, the controller 32 can cancel the process by an operation by the salesclerk.

When the cancel key 22C2 has been pressed, which is a predetermined operation, the controller 32 cancels the process for updating the amount of the electronic money and for communicating the updating of the electronic money to the management center 3.

If the determination in step SP17 is negative, the controller 32 moves to step SP18 and instructs the reader/writer 9A1 or 9A2 to transmit a write command. Accordingly, the payment amount is subtracted from the balance figure of electronic money, and hence the amount of electronic money recorded on the IC card is updated. In addition to this, the controller 32 instructs the IC card to record the payment amount and the payment date as the electronic money-use history.

Figure 8:
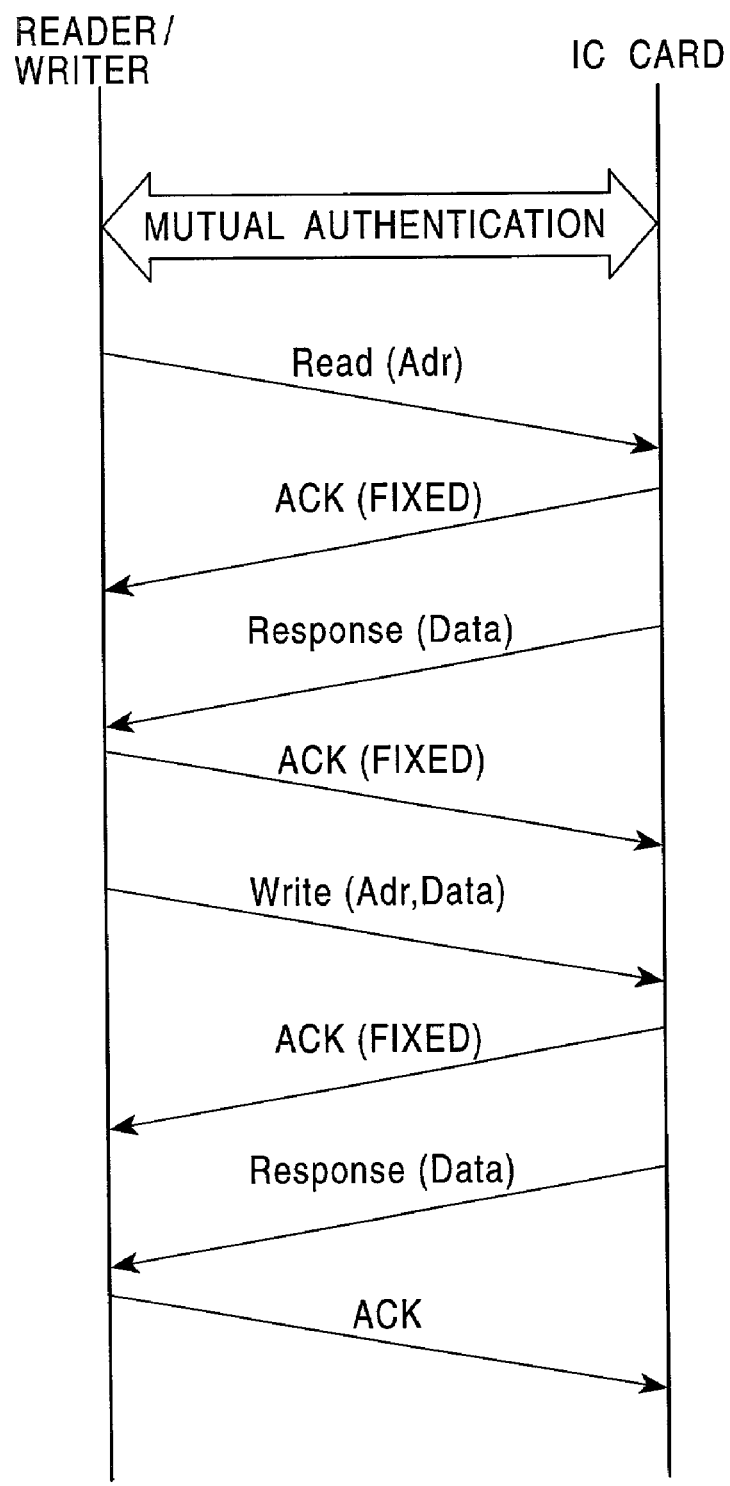
FIG. 8 is a time chart for describing data exchange between the store terminal shown in FIG. 3 and an IC card.

Referring to FIG. 8, the reader/writer 9A1 or 9A2 transmits a write command Write based on the address Adr designated by the controller 32, the written balance figure, and use history data Data. When the IC card has successfully received the write command, the IC card sends an acknowledgement status ACK. Subsequently, the IC card starts recording data in the built-in memory. If the recording is properly completed, the IC card sends a response Response to the reader/writer 9A1 or 9A2. The reader/writer 9A1 or 9A2 communicates to the controller 32 that the status and the response are received. When the reader/writer 9A1 or 9A2 receives the response, the reader/writer 9A1 or 9A2 sends an acknowledgement status ACK to the IC card.

When the controller 32 starts writing in this manner, the controller 32 moves to step SP18 (FIG. 7) and determines whether the status and the response have been properly received. If the determination is affirmative, which means that the balance figure on the IC card is properly updated, the controller 32 moves to step SP19 and records in the hard disk drive 33 the payment by the electronic money using the IC card. In this way, the controller 32 instructs the IC card, which is a portable information terminal, to update the amount of electronic money, and subsequently the IC card communicates to the controller 32 that the updating is completed. Accordingly, the controller 32 can communicate the updating of the electronic money to the management center 3. The record includes the payment date, the payment amount, the identification code of the IC card, and the like. When the payment is recorded in the hard disk drive 33, the controller 32 instructs the receipt printer 23 to print a receipt in accordance with the registration mode settings. The controller 32 returns to step SP5 and terminates the process (FIG. 5).

In contrast, if the determination in step SP18 is negative, the IC card may have been removed from the proper card placement position in the period from the transmission of the write command to the responding from the IC card. In such a case, the controller 32 moves to step SP20.

After the controller 32 has instructed that a message prompting the user or the salesclerk to again place the IC card should be displayed, the controller 32 returns to step SP3 (FIG. 5). The controller 32 again performs the process from the time at which the mutual authentication is verified onward and instructs that the write command should be issued. In this way, when the completion of the updating is not communicated from the IC card to the controller 32 after the controller 32 has instructed the IC card to update the amount of the electronic money, the controller 32 again instructs the IC card to update the amount of the electronic money.

Accordingly, the controller 32 accepts canceling operations until the controller 32 instructs the IC card to update the amount of the electronic money. In contrast, the controller 32 does not accept canceling operations from the time at which the IC card is instructed to update the amount of the electronic money to the time at which the IC card communicates the completion of the updating to the controller 32. In response to the communication of the completion of the updating from the IC card, the controller 32 can communicate the updating of the electronic money to the management center 3.

When there is insufficient electronic money available, the controller 32 moves from step SP15 to step SP22 (FIG. 6) and displays predetermined messages on the customer operation unit 21 and the store operation unit 22, respectively. As in the display screen 22C shown in FIG. 9A of the store operation unit 22 and the display screen 21C shown in FIG. 9B of the customer operation unit 21, the controller 32 informs the user and the salesclerk of the fact that there are insufficient funds available on the card. The controller 32 asks the user if the user still wishes to complete the transaction using the entire balance on the card by displaying the foregoing message and a menu including a cancel option and an execute option. Referring to FIGS. 9A and 9B, the balance on the IC card is ¥3000 with respect to a payment amount of ¥4000.

In step SP23, the controller 32 determines whether the cancel key 22C2 on the display screen 22C of the store operation unit 22 has been pressed. If the determination is affirmative, the controller 32 moves from step SP23 to step SP5 (FIG. 5). When there is insufficient electronic money available, and when the user selects to cancel the process, the controller 32 cancels the payment using electronic money. In such a case, the payment transaction can be completed by cash, or the purchase of a product can be canceled.

In contrast, if the determination in step SP23 is negative, the controller 32 moves to step SP24 and determines whether the execute option on the display screen 22C of the store operation unit 22 has been pressed. If the determination is negative, the controller 32 returns to step SP23. If the determination in step SP24 is affirmative, the controller 32 moves to step SP25. In step SP25, the controller 32 updates the record on the IC card in a manner similar to steps SP17 to SP20, and hence the transaction is completed using the entire balance recorded on the IC card. The controller 32 records the payment using the IC card. The controller 32 computes the outstanding amount by subtracting the paid amount from the total payment amount and returns to step SP3.

The store terminal 9 can settle up the outstanding amount using another IC card by repeating a similar process. Alternatively, the store terminal 9 can cancel the process, and the user can pay for the outstanding amount by cash. When there is insufficient electronic money available recorded on the IC card, and when the payment transaction is completed using the entire amount of electronic money recorded on the IC card, the store terminal 9 records the payment subsequent to receiving the response from the IC card, as in the case in which there is sufficient electronic money available. If the store terminal 9 receives no response, the process from the time at which the mutual authentication is verified onward is repeated. In this way, the payment process is reliably performed.

When the controller 32 compares the payment amount and the amount of the electronic money recorded on the IC card and determines that there is insufficient electronic money available recorded on the IC card, the controller 32 provides the user with the menu including the cancel key so that the user can select whether to pay by electronic money. In accordance with the menu choice, the amount of the electronic money recorded on the IC card is updated.

In the foregoing process, the controller 32 separately checks the identification code of the IC card, which is detected by the reader/writer, the status, and the like. If an IC-card malfunction is detected, the controller 32 displays predetermined messages and informs the user and the salesclerk of the IC-card malfunction. When displaying the messages, the controller 32 causes the customer operation unit 21 and the store operation unit 22 to display different messages. In this way, the user will not be offended, whereas the salesclerk will reliably be informed of the main points.

(4) Electronic Money Transaction in Cooperation with POS Register

Figure 10:
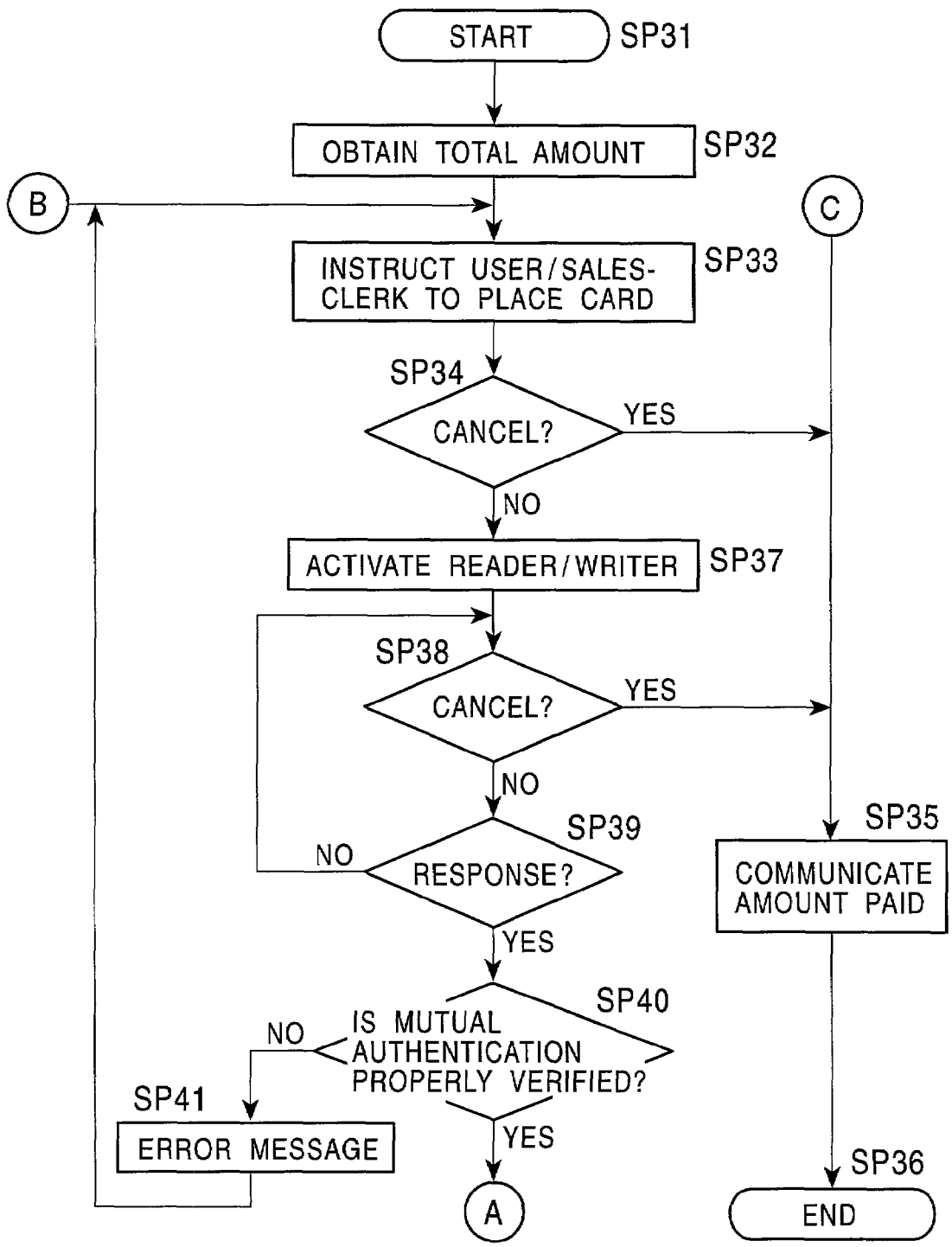
FIG. 10 is a flowchart showing a process for performing a transaction using the store terminal shown in FIG. 3 in cooperation with a point-of-sales (POS) register.
Figure 11:
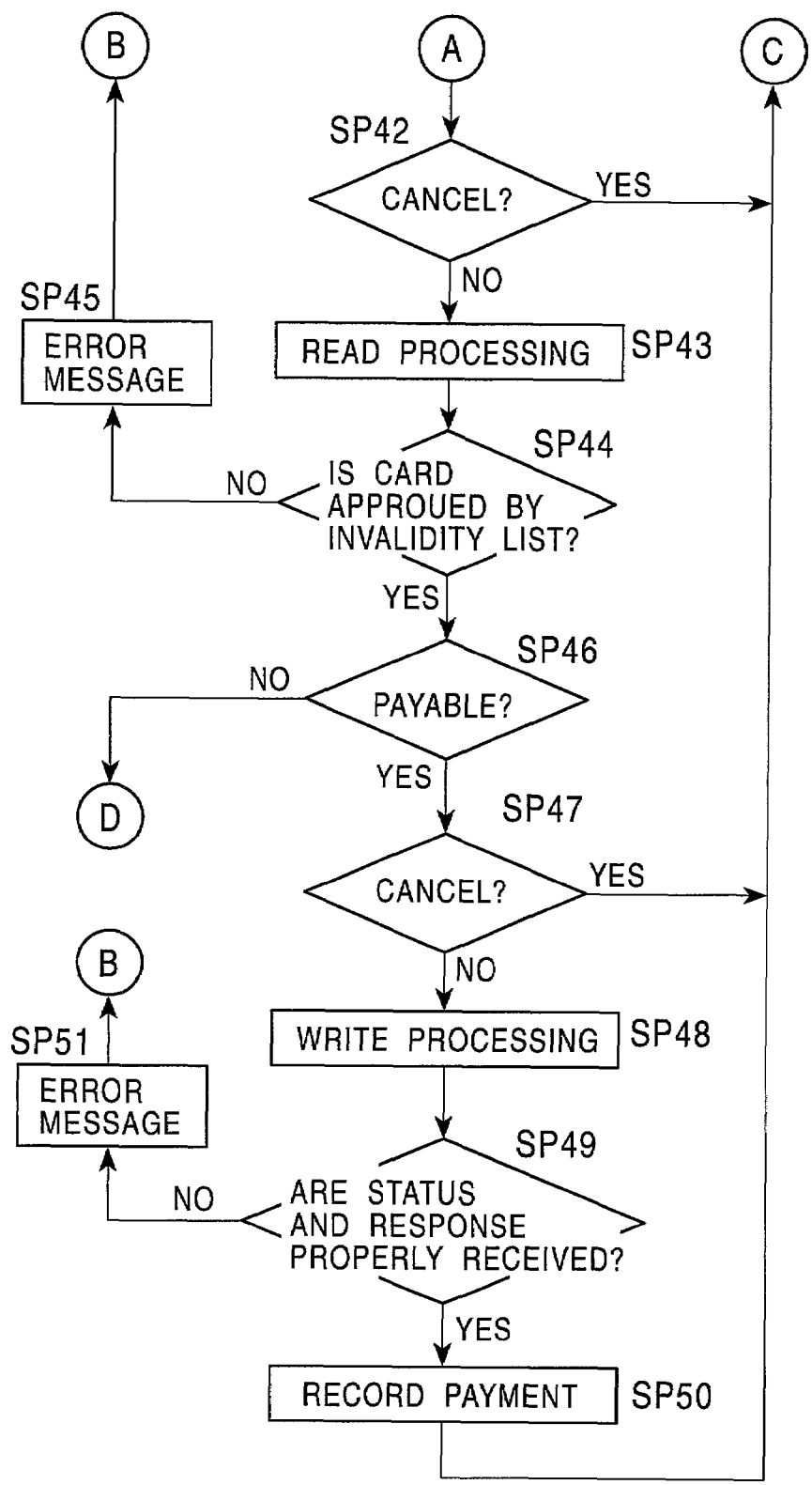
FIG. 11 is a flowchart showing processing steps subsequent to the flowchart shown in FIG. 10.
Figure 12:
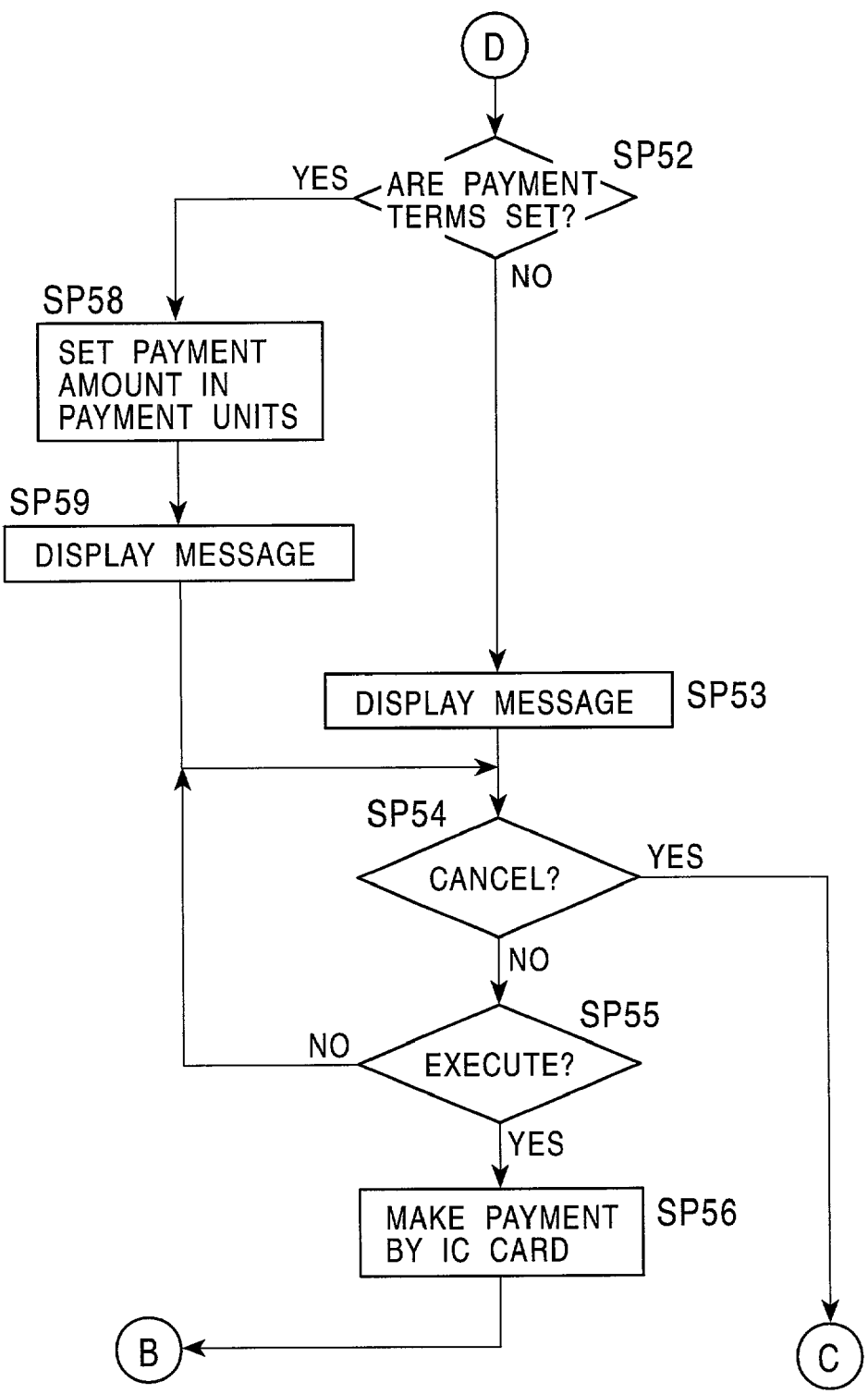
FIG. 12 is a flowchart showing processing steps subsequent to the flowchart shown in FIG. 11.

FIGS. 10 to 12 show a process for performing a payment transaction using the controller 32 in cooperation with the POS register 24 in accordance with the foregoing settings.

When the transaction mode is selected by the salesclerk, the controller 32 displays similar display screens as those shown in FIG. 4. In this state, the salesclerk operates the POS register 24 and hence the total payment amount is computed for the user. The controller 32 moves from step SP31 to step SP32 and obtains the total amount from the POS register 24.

The controller 32 moves to step SP33, displays the obtained amount on the customer operation unit 21 and the store operation unit 22, and instructs the user or the salesclerk to place the IC card on one of the card presentation holder 21B or 22B. In step SP34, the controller 32 determines whether the cancel key 22C2 has been pressed by the salesclerk. If the cancel key 22C2 has been pressed, the controller 32 moves from step SP34 to step SP35 and communicates the amount paid by electronic money to the POS register 24. The controller 32 moves to step SP36 and terminates the process. When a canceling operation is performed, in this case, nothing is paid for by electronic money. The controller 32 communicates a payment amount of ¥0 to the POS register 24, and hence the transaction can be completed using cash.

In contrast, when the cancel key 22C2 is not pressed, the controller 32 moves to step SP37. The controller 32 activates the reader/writer 9A1 or 9A2. In step SP38, the controller 32 again determines whether the cancel key 22C2 has been pressed. If the determination is affirmative, the controller 32 moves from step SP38 to step SP35 and communicates the payment amount to the POS register 24. Subsequently, the controller 32 terminates the process and returns to the initial state of the transaction mode.

In contrast, if the determination in step SP38 is negative, the controller 32 moves to step SP39 and determines whether a response from the IC card has been received. If the determination is negative, the controller 32 returns to step SP38.

When the IC card is placed on the card presentation holder 21B or 22B and a response to a communication is received from the IC card, the controller 32 moves to step SP40 and instructs the reader/writer 9A1 or 9A2 that has detected the response to verify the mutual authentication. Based on the mutual authentication result received from the reader/writer 9A1 or 9A2, the controller 32 determines whether the mutual authentication is properly verified. If the determination is negative, the controller 32 moves to step SP41. The controller 32 displays messages on the customer operation unit 21 and the store operation unit 22 indicating that an incorrect IC card has been placed and returns to step SP33. In doing so, the controller 32 instructs the user to again place the IC card. As circumstances demand, a canceling operation by the salesclerk is accepted.

In contrast, if the mutual authentication is properly verified, the controller 32 moves from step SP40 to step SP42 (FIG. 11) and again determines whether the cancel key 22C2 has been pressed. If the determination is affirmative, the controller 32 moves from step SP42 to step SP35 (FIG. 10) and communicates the payment amount to the POS register 24. Subsequently, the controller 32 terminates the process and returns to the initial state of the transaction mode. In contrast, if the determination in step SP42 is negative, the controller 32 moves to step SP43 and controls the reader/writer 9A1 or 9A2 to read the record in the memory of the IC card.

In step SP44, the controller 32 searches for an invalidity list using the read identification code of the IC card and determines whether the use of the IC card is prohibited. If the use of the IC card is prohibited, the controller 32 moves to step SP45 and informs the user and the salesclerk of the fact that the use of the placed IC card is prohibited using the customer operation unit 21 and the store operation unit 22. Subsequently, the controller 32 returns to step SP33.

In contrast, if the use of the IC card is not prohibited, the controller 32 moves from step SP44 to step SP46 and determines whether the payment can be made using the electronic money on the IC card. If there is sufficient electronic money available, the controller 32 moves from step SP46 to step SP47 and again determines whether the cancel key 22C2 has been pressed. If the determination is affirmative, the controller 32 moves from step SP47 to step SP35 (FIG. 10).

In contrast, if the determination in step SP47 is negative, the controller 32 moves to step SP48 and instructs the IC card to update the amount of the electronic money so that the payment amount is subtracted from the balance figure of the electronic money under the control of the reader/writer 9A1 or 9A2. The controller 32 also instructs the reader/writer 9A1 or 9A2 to transmit a write command so as to record the payment amount and the payment date as the electronic money-use history on the IC card.

When the writing processing begins in this way, the controller 32 moves to step SP49 and determines whether the controller 32 has properly received the status and the response. If the determination is affirmative, which means that in this case the balance figure on the IC card is properly updated, the controller 32 moves to step SP50 and records the payment by electronic money, using the IC card, in the hard disk drive 33. Accordingly, when the controller 32 instructs the IC card, which is a portable information terminal, to update the amount of the electronic money, and subsequently the IC card communicates the completion of the updating to the controller 32, the controller 32 can communicate the updating of the electronic money to the management center 3. When the payment is recorded in the hard disk drive 33 in this manner, the controller 32 instructs the receipt printer 32 to print a receipt in accordance with the registration mode settings and moves to step SP35 (FIG. 10). Therefore, the controller 32 can complete the payment transaction using the electronic money in which the payment amount is computed by operating the POS register 24.

In contrast, if the determination in step SP49 is negative, the IC card may have been removed from the proper card placement position in the period from the transmission of the write command to the responding from the IC card. In such a case, the controller 32 moves to step SP51.

After the controller 32 has instructed that a message prompting the user or the salesclerk to again place the IC card should be displayed, the controller 32 returns to step SP33 and again instructs that the IC card should be placed. Accordingly, when the payment of an amount computed by operating the POS register 24 is completed using electronic money, the controller 24 can reliably process the payment transaction.

In contrast, if there is insufficient electronic money available to complete the transaction, the determination in step SP46 is negative. In step SP52 (FIG. 12), the controller 32 determines whether payment terms are set. Stores in general prepare coins and the like so that customers who pay by cash can receive change. When the store terminal 9 operates in cooperation with the POS register 24 to process a payment, the store terminal 9 accepts settings of payment terms in order that the types of coins and bills that the store must prepare are limited by initializing the store terminal 9. The controller 32 can accept such settings of payment terms prior to being installed.

If no payment term is set, the controller 32 moves from step SP52 to step SP53. As described with reference to FIGS. 9A and 9B, the store operation unit 22 and the customer operation unit 21 display respective messages to inform the user of the fact that there is insufficient money available on the card and to ask the user whether the user still wishes to complete the transaction using the entire card balance.

In step SP54, the controller 32 determines whether the cancel option on the display screen 22C of the store operation unit 22 has been operated. If the determination is affirmative, the controller 32 moves from step SP54 to step SP35. In contrast, if the determination in step S54 is negative, the controller 32 moves to step SP55 and determines whether the execute option has been operated. If the determination in step SP55 is negative, the controller 32 returns to step SP54. If the determination is affirmative, the controller 32 moves to step SP56. As described hereinabove, the controller 32 uses the entire amount of electronic money to make the payment and returns to step SP33.

When there is insufficient electronic money available to make the full payment, the controller 32 executes the payment of the amount that can be paid by the electronic money available. Subsequently, the controller 32 returns to step SP33 and prompts the user to complete the payment using another IC card. If the cancel option is operated at this point, the outstanding amount is communicated to the POS register 24 so that the user can pay the balance by cash.

In contrast, when payment terms have been set, the controller 32 moves from step SP52 to step SP58. The controller 32 sets the payment amount using electronic money so that change can be given by preset bills and coins when the user pays the outstanding amount by cash and receives change.

Specifically, the controller 32 rounds down the amount of the remaining electronic money so that change can be given by preset bills and coins. The rounded amount is used as the amount to be paid using electronic money. Therefore, when the outstanding amount is paid by cash and change is given to the user, the change can be given by preset bills and coins.

In other words, for example, the store does not have to give change in coins by setting the unit cost in 1000-yen units. In such a case, when payment terms are set such that payments should be made in 5000-yen bills and 1000-yen bills, the controller 32 selects the smaller amount, that is, 1000 yen, as a unit and rounds down the amount of the remaining electronic money. Accordingly, the controller 32 computes the amount to be paid by electronic money. Specifically, when the electronic money balance is, for example, 5312 yen, and when a payment of 9000 yen must be made, the amount of the remaining electronic money, that is, 5312 yen, is rounded down in 1000-yen units to an amount of 5000 yen, which is used as the amount to be paid by electronic money. A remainder of 4000 yen is the outstanding amount.

In this manner, the controller 32 computes the amount to be paid by electronic money. In step SP59, the controller 32 displays such information on the customer operation unit 21 and the store operation unit 22. In this case, as circumstances demand, the controller 32 displays, in addition to the displayed information shown in FIGS. 9A and 9B, post-processing information such as the amount that will be paid after the payment by electronic money is made and the remainder of the electronic money on the IC card.

The controller 32 displays these messages in this manner and moves to step SP54. The controller 32 executes the process in a manner similar to the case in which no payment term is set. When the controller 32 operates in cooperation with the POS register 24 to process the transaction, the controller 32 communicates the balance figure that remains after executing the process to the POS register 24. In doing so, the subsequent process is correctly performed.

When the controller 32 operates in cooperation with the POS register 24 to process the transaction, as described with reference to FIGS. 5 to 7, the controller 32 instructs the IC card to update the amount of electronic money on the IC card and waits for a response before recording the payment. If the controller 32 receives no response, the controller 32 returns to step SP33. This enables the controller 32 to reliably process the payment transaction using the electronic money.

(5) Totaling Mode

Figure 13:
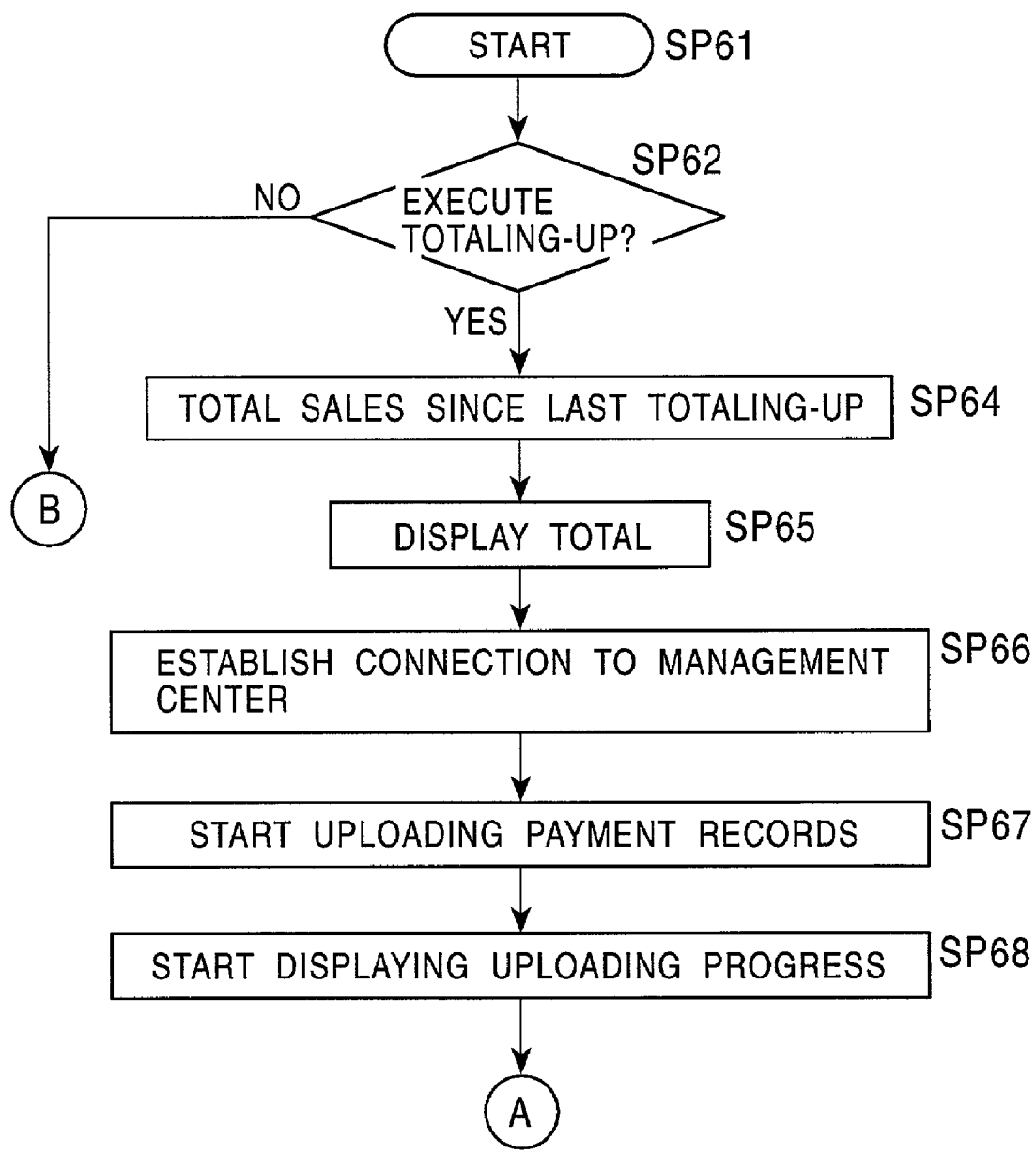
FIG. 13 is a flowchart showing a process for totaling up payments using the store terminal shown in FIG. 3.
Figure 14:
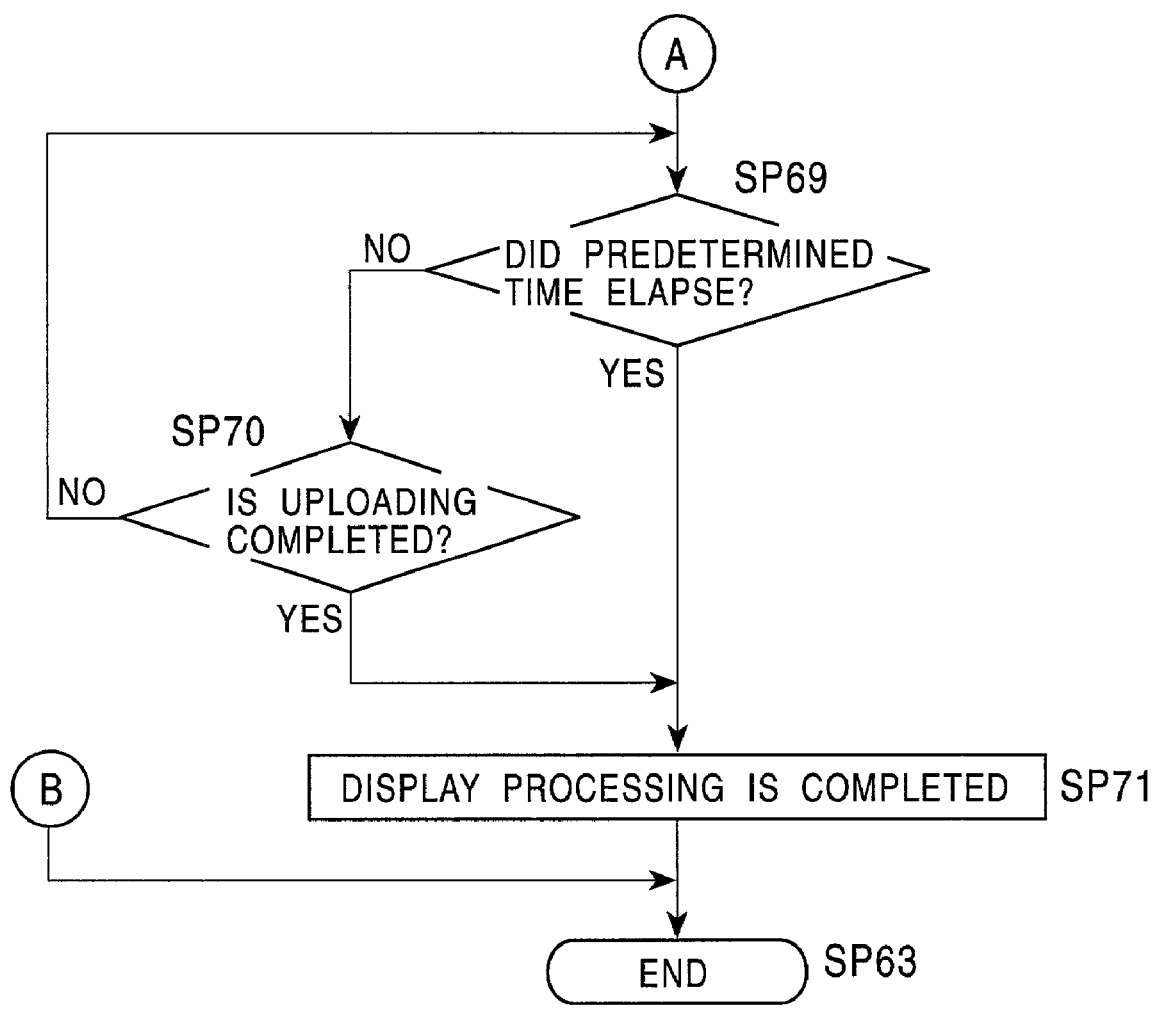
FIG. 14 is a flowchart showing processing steps subsequent to the flowchart shown in FIG. 13.
Figure 15:
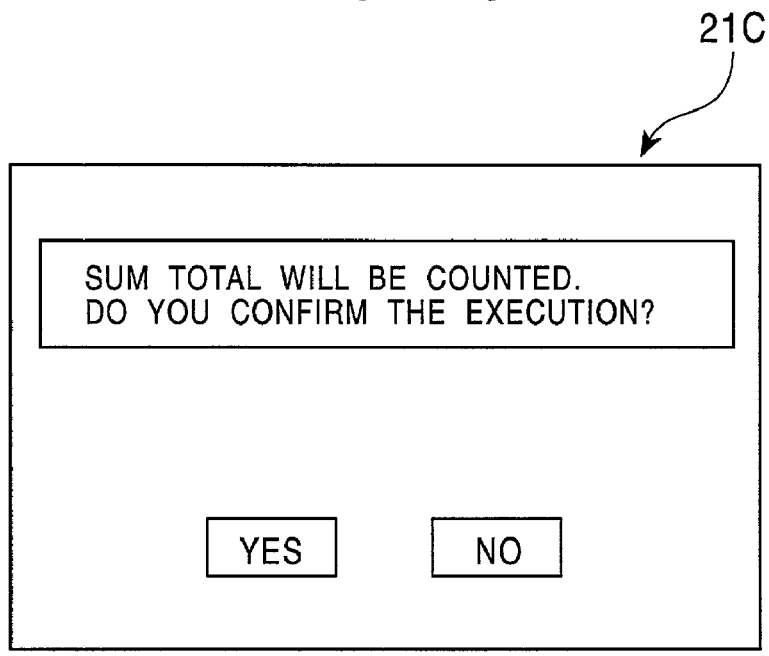
FIG. 15 is a plan view of a display screen of the store terminal 3 performing the totaling-up processing.

FIGS. 13 and 14 show a process performed by the controller 32 in the totaling mode. When the totaling mode is set by an operation by the salesclerk, the controller 32 displays a display screen shown in FIG. 15 on the display screen 22C of the store operation unit 22. The totaling mode is a mode for totaling sales since the last totaling-up.

The controller 32 displays, on the display screen 22C of the store operation unit 22, a message that confirms the totaling-up and a menu (including "yes" and "no" options) asking the user whether to execute the totaling-up. The controller 32 moves from step SP61 to step SP62, accepts operations performed on the display screen 22C, and determines whether to execute the totaling-up. If the salesclerk operates the menu to cancel the totaling-up, the controller 32 moves to step SP63

(FIG. 14) and terminates the process. If the execute option for executing the totaling-up is operated, the controller 32 moves to step SP64.

Figure 16:
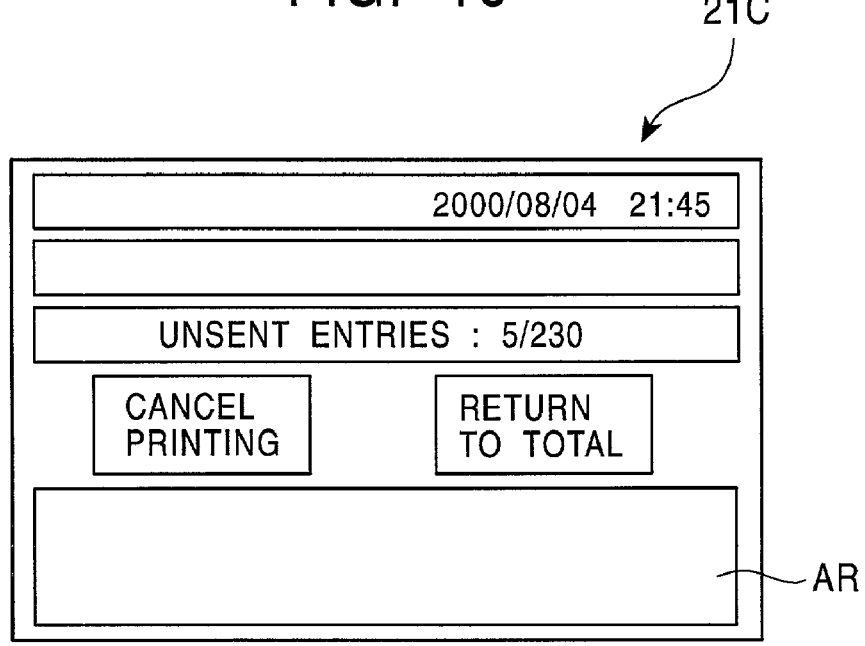
FIG. 16 is a plan view of a display screen of the store terminal 3 performing the uploading of data.

The controller 32 totals payments by electronic money from the last totaling-up to the current totaling-up, thus totaling the sales. In step SP65, the controller 32 switches the display on the display screen 22C to display the total. FIG. 16 is a plan view of the display screen 22C in this case. The controller 32 displays the present date and time at the top, followed by the total amount of sales.

In step SP66, the controller 32 controls the interface 31 to establish a dial-up connection to the management center 3. In step SP67, the controller 32 starts uploading, to the management center 3, records of the payments which have been counted up and totaled. When the totaling-up is to be performed after business hours every day, in step SP67, the controller 32 starts uploading the records of the payments, which are the sales since the totaling-up performed the previous day.

After the controller 32 has started the uploading, in step SP68, the controller 32 displays the progress of the uploading. Specifically, the controller 32 displays the message "unsent entries" at the middle of the display screen shown in FIG. 16. At the right of this message, the number of unsent payment records and the total number of payment records to be uploaded are indicated in fractional form. Referring to FIG. 16, there are a total of 230 records to be uploaded, and a reminder of 5 records has not been transmitted. After the controller 32 has started displaying progress in this manner, the controller 32 changes the display every time the number of unsent records decreases. Hence, the salesclerk can confirm progress from reading the display.

In step SP69 (FIG. 14), the controller 32 determines whether a predetermined period of time has elapsed since the beginning of the uploading. If the determination is negative, the controller 32 moves to step SP70 and determines whether the uploading has been completed. If the determination is negative, the controller 32 returns to step SP69. In this manner, the controller 32 repeats steps SP69-SP70-SP69, and when the uploading is completed, the controller 32 moves from step SP70 to step SP71. In contrast, if a predetermined period of time has elapsed due to a line malfunction or the like before the uploading is completed, the controller 32 moves from step SP69 to step SP71.

The controller 32 displays the termination of the process on the display screen 22C of the store operation unit 22. In doing so, the controller 32 can make the salesclerk who operates the store terminal 9 believe that the operation has been properly completed in spite of the fact that the payment records were not properly uploaded.

As shown in FIG. 16, the controller 32 displays, on the display screen showing the totaling result, a menu including a cancel-printing option and a return-to-total option. The controller 32 executes respective processing that corresponds to the menu choice. While performing the corresponding processing, the controller 32 executes the foregoing uploading in the background.

(6) Processing After the Activation

When power is turned on, the controller 32 downloads key data required to exchange data with the IC card and an invalidity list. Using the downloaded data, the controller 32 processes payments, uploads records, and the like as described above.

Figure 17:
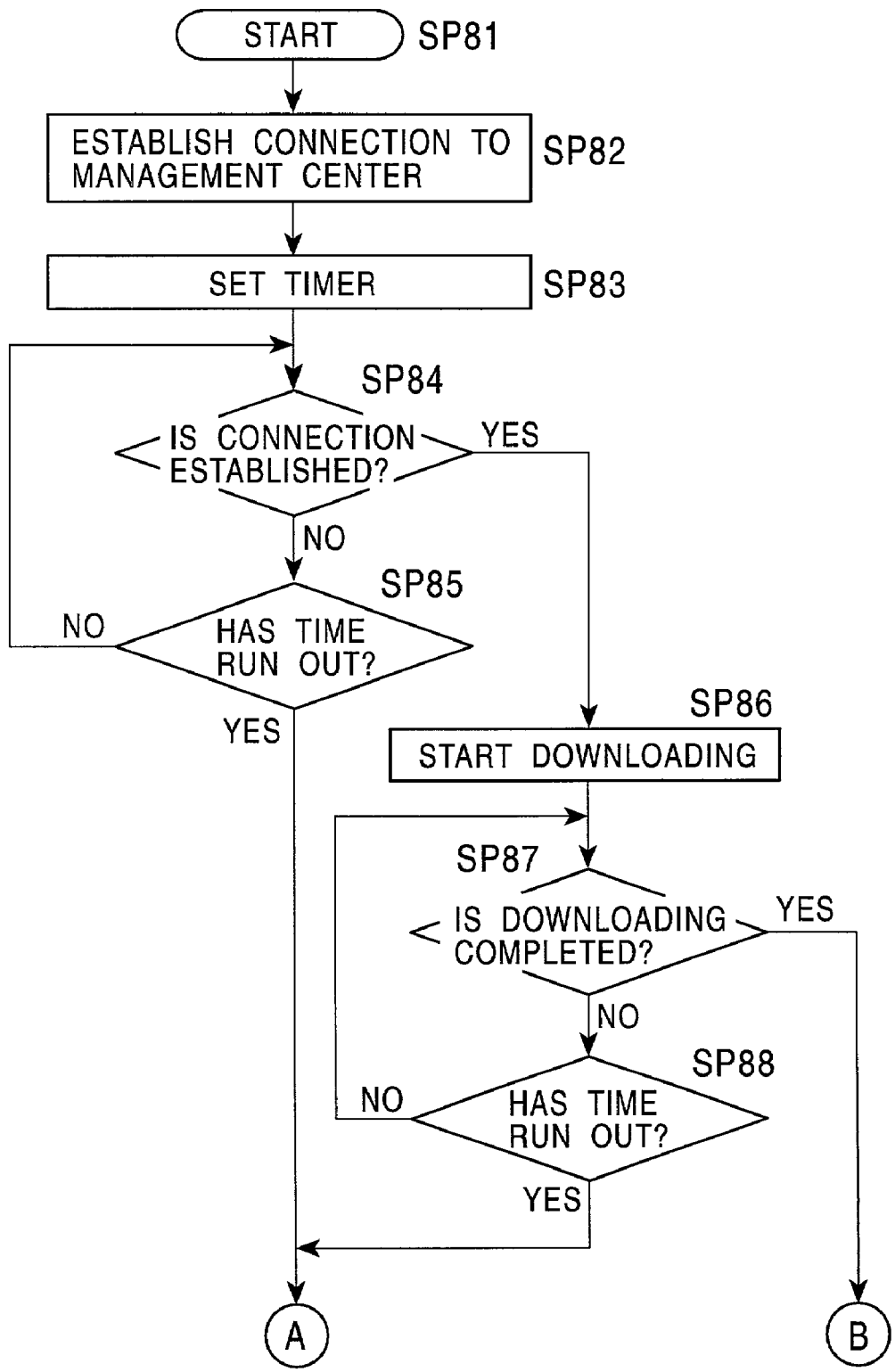
FIG. 17 is a flowchart showing a process for downloading key data and the like using the store terminal 3 shown in FIG. 3.

FIG. 17 is a flowchart showing a process performed by the controller 32 after the activation. When power is turned on, the controller 32 moves from step SP81 to step SP82 and controls the interface 31 to establish a connection to the management center 3. In step SP83, the controller 32 activates a timer.

In step SP84, the controller 32 determines whether the controller 32 has been connected to the management center 3. If the determination is negative, the controller 32 moves to step SP85 and checks a measured value of the timer that has been set in step SP83, thus determining whether a predetermined period of time has elapsed and time is up. If the determination is negative, the controller 32 returns to step SP84. The controller 32 repeats steps SP84-SP85-SP84 until a connection to the management center 3 is established within a predetermined time limit.

If the controller 32 becomes connected to the management center 3 before a predetermined period of time has elapsed, the controller 32 moves to step SP86 and starts downloading invalidity-list data and key data prepared by the management center 3. When the controller 32 is connected to the management center 3 and receives a response, the controller 32 executes a series of processes such as verification of mutual authentication and starts the downloading.

After the controller 32 has started the downloading of data, the controller 32 moves to step SP87 and determines whether the downloading has been completed. If the determination is negative, the controller 32 moves to step SP88. The controller 32 checks a measured value of the timer that has been set in step SP83, thus determining whether a predetermined period of time has elapsed and time is up. If the determination is negative, the controller 32 returns to step SP87. In this manner, the controller 32 repeats steps SP87-SP88-SP87 within a predetermined time limit and downloads data such as the invalidity list and the like from the management center 3.

Figure 18:
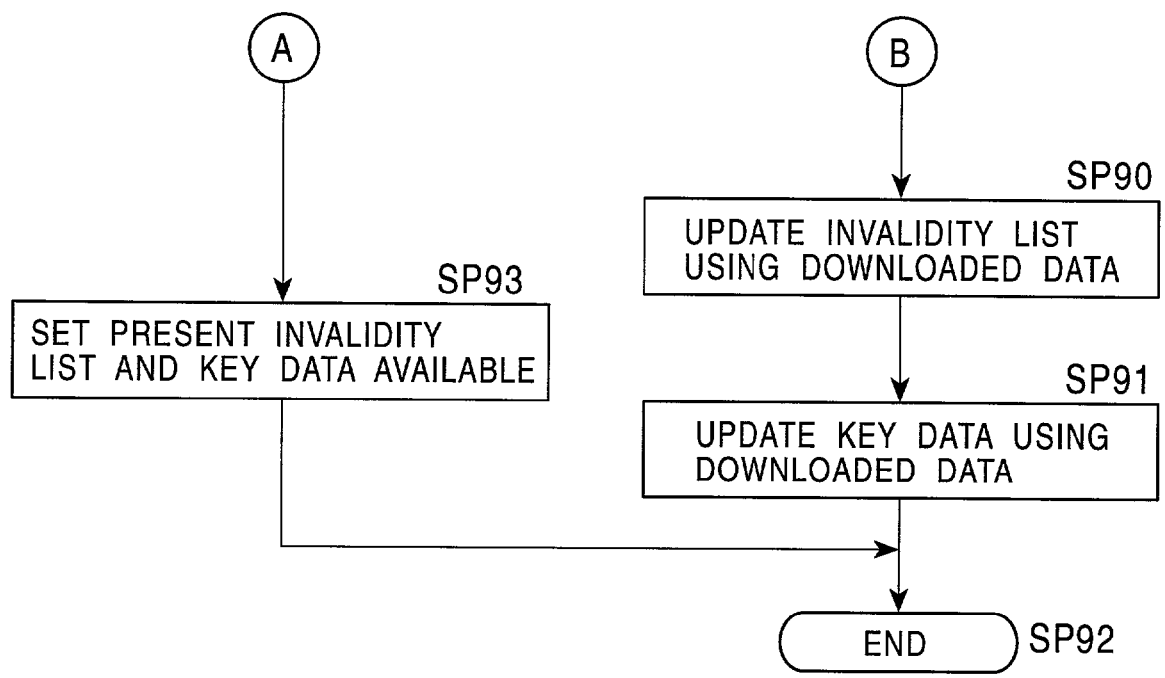
FIG. 18 is a flowchart showing processing steps subsequent to the flowchart shown in FIG. 17.

When the downloading has been completed in this manner, the determination in step S87 becomes affirmative. Therefore, the controller 32 moves from step SP87 to step SP90 (FIG. 18). The controller 32 updates the stored invalidity list using the downloaded data. In step SP91, the controller 32 updates the stored key data using the downloaded data. In step SP92, the controller terminates the process. In this way, the controller 32 after the activation obtains the most recent data from the management center 3 and processes a payment by electronic money with the IC card using the obtained data. The electronic money system 1 can prevent the illegal use of electronic money and the like, and hence the security of the entire system is improved.

In contrast, when a public line has a malfunction due to high traffic or the like, it becomes difficult for the controller 32 to establish a connection to the management center 3 within a predetermined period of time and to download the data. When the store terminal 9 is moved to a storefront or the like, and when a payment is processed, the store terminal 9 is disconnected from a phone line, and it becomes difficult for the store terminal 9 to download the data. In such cases, the determination in step SP85 or step SP88 is affirmative.

In such cases, the controller 32 moves to step SP93 and sets the current invalidity list and the key data recorded in the hard disk drive 33 available. In step SP92, the controller 32 terminates the process. When the controller 32 after the activation has difficulty in obtaining the most recent data from the management center 3, the controller 32 uses data possessed up until that time to perform a series of processes. The controller 32 encrypts the invalidity list and the key data and stores the encrypted data in the hard disk drive 33. This ensures the security of the overall system even when the store terminal 9 itself is stolen.

(7) Maintenance Operation

The management center 3 can evaluate the results of the uploading of payment records, the downloading of the invalidity list, and the like. When the uploading and the downloading frequently fail, it can be concluded that the store terminal 9 has a particular malfunction. In particular, when the uploading of payment records fails, it becomes difficult for the electronic money system 1 to complete settlement, which may give rise to very serious problems.

When the uploading of payment records is not completed, and when the downloading after the activation is performed, it is possible to determine that the uploading has run out of time due to a temporary line malfunction caused by increased traffic or the like, that the line malfunction has been repaired by now, and that the store terminal 9 has been turned on. Therefore, the management server 5 at the management center 3 accesses the store terminal 9 with a predetermined timing and instructs the controller 32 to finish the uncompleted uploading of payment records. Since the total number of payments has been communicated to the management center 3, the management center 3 can instruct the controller 32 to upload the remaining payment records in accordance with the communication. In this case, the salesclerk may have operated the store terminal 9 to execute the foregoing payment processing. Therefore, the controller 32 executes the uploading in the background in accordance with the instruction given by the management server 5.

Alternatively, a connection to the management center 3 may not be established in the uploading of payment records. In such a case, it becomes difficult for the management center 3 to know the total number of payment records. Also, the downloading after the activation may become difficult. When such malfunctions occur, the management center 3 sends a maintenance staff to solve the problem.

Figure 19:
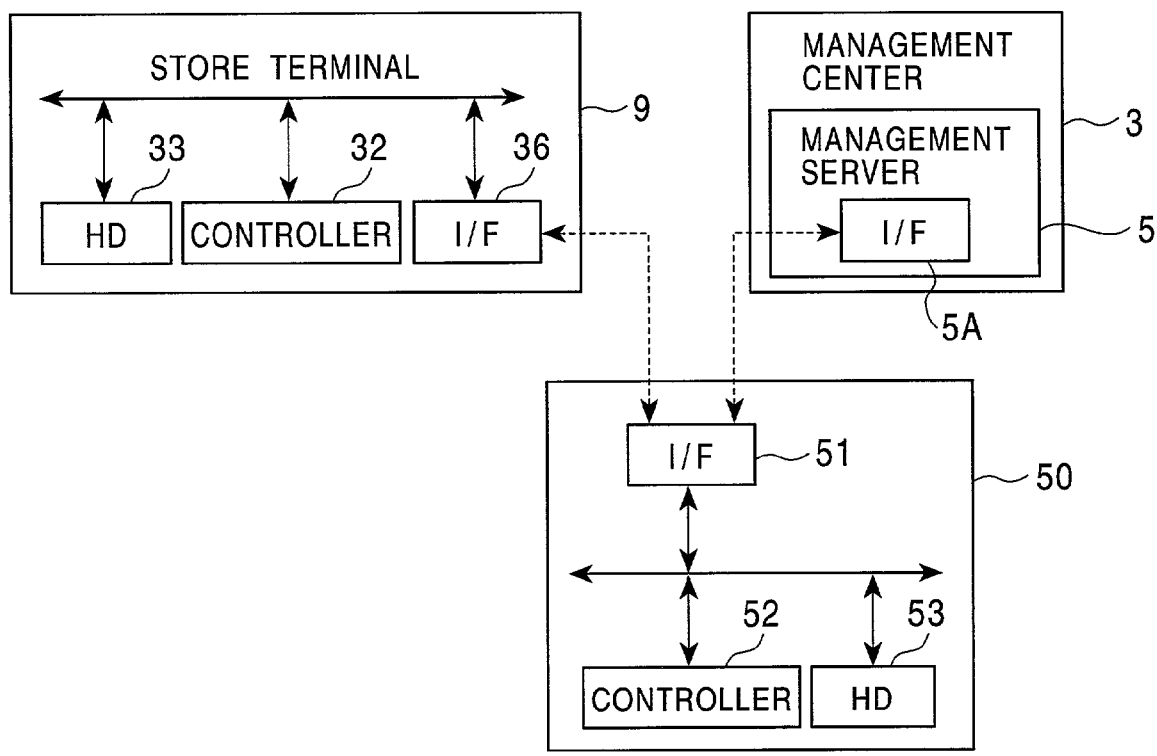
FIG. 19 is a block diagram of the electronic money system shown in FIG. 1 in which a portable terminal is used to upload and download data.

FIG. 19 is a block diagram of the maintenance operations. The maintenance staff brings a portable terminal 50 and does maintenance on the store terminal 9. Specifically, the portable terminal 50 is formed in a manner similar to forming a portable personal computer. The portable terminal 50 can be connected to an interface 5A of the management server 5 through an interface 51. The portable terminal 50 can be carried to the store, so that the portable terminal 50 can be connected to an interface 36 of the store terminal 9.

Prior to being carried to the store to do maintenance, the portable terminal 50 is connected through a predetermined line or directly to the management server 5. Under the control of a built-in controller 52, the portable terminal 50 executes processing such as verification of mutual authentication, as in each terminal in the electronic money system 1. After the mutual authentication has been verified, the portable terminal 50 encrypts invalidity-list data and key data, which are to be downloaded to the store terminal 9, and records the encrypted data in a built-in hard disk drive (HD) 53.

After a prior operation has been performed, the portable terminal 50 is carried to the store and is connected to the store terminal 9. When the controller 32 of the store terminal 9 executes a predetermined operation while displaying a predetermined screen among screens in the foregoing modes, the operation mode is switched to a maintenance mode. When an operation similar to that in the transaction mode is performed, the controller 32 verifies mutual authentication with the portable terminal 50 and transmits unsent payment records to the portable terminal 50. The portable terminal 50 records the payment records in the hard disk drive 53. In this case, the store terminal 9 sets a signature, encrypts payment records, and uploads the encrypted records, as in the case of uploading to the management center 3.

In the same maintenance mode, the controller 32 downloads the invalidity-list data and the key data recorded in the portable terminal 50 in a manner similar to downloading the invalidity-list data and the key data from the management center 3.

When the payment records are downloaded in this manner, the portable terminal 50 is connected to the management server 5 at the management center 3 in a manner similar to the case in which the portable terminal 50 downloaded in advance the invalidity-list data and the key data from the management center 3. The portable terminal 50 uploads the downloaded payment records to the management server 5. Accordingly, the store terminal 9 can upload payment records and settles the payments even when a serious line malfunction occurs.

When the controller 32 is connected to the portable terminal 50 to perform the uploading, or when the controller 32 is connected to the management center 3 through a line in the maintenance mode to perform the uploading and the downloading, the controller 32 displays the progress of the processing in detail in area AR at the bottom of the display screen shown in FIG. 16. Specifically, for example, when the controller 32 is dialing up the management center 3, the controller 32 displays a message indicating that the controller 32 is dialing up. When the controller 32 succeeds in dialing up the management center 3, the controller 32 displays this. When verifying mutual authentication, the controller 32 displays this. When the controller 32 starts uploading or downloading, the controller 32 displays that it has started the processing and subsequently displays the details of the processing such as the amount of data being uploaded or downloaded. The controller 32 is thus configured to simplify the work of the maintenance staff.

The portable terminal 50 encrypts data obtained from the management center 3 and data obtained from the store terminal 9 and records the encrypted data. This prevents mishaps such as leakage of key data due to theft or the like.

(8) Operation of the Embodiment

In the electronic money system 1 (FIG. 1), various data are exchanged among the management center 3, the issuing terminal 6, the crediting terminal 7, and the like using encryption and mutual authentication by predetermined key data. As a result, an IC card is issued to a user, and electronic money employing the IC card becomes available.

In the electronic money system 1, key data required for electronic money processing is periodically generated at the management center 3. The key data is encrypted and sent to the issuing terminal 6 in real time. In addition to an invalidity list that is a list of invalid IC cards, the key data is encrypted and sent to the crediting terminal 7 and the automatic vending machine server 10. When the store terminal 9 after the activation gains access to the management center 3, the key data and the invalidity list are similarly encrypted and sent to the store terminal 9.

When the power supply is cut off, the issuing terminal 6, the crediting terminal 7, and the automatic vending machine server 10 delete the key data and the invalidity list. This prevents leakage of key data and the like due to theft of the issuing terminal 6, the crediting terminal 7, and the automatic vending machine server 10.

The store terminal 9 (FIGS. 16 and 17) after the activation gains access to the management center 3 and obtains the key data and the like, and the records in the hard disk drive 33 are updated. Therefore, various processes are performed based on the most recently obtained data.

When the store terminal 9 after the activation gains access to the management center 3 and obtains the data in this manner, and when there is a line malfunction such as a reduced data transfer rate due to increased traffic and a switchboard failure, or when the store terminal 9 is moved to a storefront and is used off-line, it becomes difficult for the store terminal 9 to obtain the data from the management center 3 (FIGS. 17 and 18). In such cases, the store terminal 9 stores the data, which are to be deleted when power is turned off, in the hard disk drive 33. When the data cannot be obtained even after a predetermined period of time has elapsed, the store terminal 9 begins processing based on the data stored in the hard disk drive 33.

Therefore, the store terminal 9 can deal with a line malfunction. Furthermore, the store terminal 9 can be used at a location such as at a storefront in which it is difficult to establish a line connection. When the store terminal 9 stores the key data and the like in the hard disk drive 33 in this manner, the data are encrypted and are recorded (FIG. 3). Therefore, leakage of key data due to theft or the like is prevented.

When such a line malfunction continues (FIG. 19), the management center 3 downloads the data to the portable terminal 50, and subsequently the portable terminal 50 is carried to the store and uploads the data to the store terminal 9. In this way, the electronic money system 1 can deal with a line malfunction or the like.

As in the case in which data is exchanged between the management center 3 and the store terminal 9, the portable terminal 50 enables the management center 3 and the store terminal 9 to exchange data with each other by encryption and mutual authentication using key data. Furthermore, the data obtained from the management center 3 is encrypted and recorded. Accordingly, even when a mishap such as theft or the like occurs, the security of the system is ensured.

In this manner, key data and the like are distributed in the electronic money system 1, and hence data can be exchanged securely. On the assumption that encryption using the key data is performed and that the signature is added, the issuing terminal 6 issues the IC card 2A which carries therein electronic money available. Specifically, in the electronic money system 1, when the IC card 2A is set on the issuing terminal 6, mutual authentication is verified between the IC card 2A and the reader/writer 6A of the issuing terminal 6. Subsequently, data is exchanged between the management center 3 and the issuing terminal 6, thus reserving a region in the IC card 2A, which is required to perform electronic money processing. Furthermore, various key data required to exchange data among terminals, the identification code of the IC card 2A, and the like are recorded. At the management center 3, the identification code of the IC card 2A or the like is recorded in the transaction database 15.

When the IC card 2B is set on the crediting terminal 7, mutual authentication is similarly verified between the IC card 2B and the reader/writer 7A of the crediting terminal 7. Subsequently, data is exchanged between the crediting terminal 7 and the bank network 8 through the connection server 13, thus withdrawing cash from a user's account and updating the amount of electronic money recorded on the IC card 2B. Accordingly, electronic money is credited to the IC card 2B. The crediting is recorded on the IC card 2B, and the data is communicated to the management server 5 at the management center 3. As a result, concerning the record for the IC card 2B stored in the transaction database 15, the amount of electronic money stored on the IC card 2B is updated.

When a user goes shopping and purchases items at a store, the payment amount is subtracted from the amount of electronic money recorded on the IC card 2. In addition, the reduction in amount is communicated to the management center 3.

Specifically, when making the payment using electronic money, and when performing the transaction only by the store terminal 9 (FIGS. 2 to 4), the store operation unit 22 of the store terminal 9 is operated to total amounts to be paid for the items, thus computing the total payment amount. Furthermore, the user is instructed to place the IC card 2C on the card presentation holder 21B. When the IC card 2C is placed, mutual authentication is verified between the IC card 2C and the reader/writer 9A (FIGS. 5 to 8). The recorded balance figure of the electronic money on the IC card 2C is loaded. When there is a sufficient balance available, the payment amount is subtracted from the balance figure, and the amount of electronic money recorded on the IC card 2C is updated. The store terminal 9 records the payment made using the electronic money so that the store terminal 9 can batch upload payment records subsequently.

At this point, in the electronic money system (FIG. 8), a write command is issued to the IC card 2C, instructing that the amount of electronic money should be updated. When a communication that the updating is completed is received from the IC card 2C, the store terminal 9 records the payment and becomes capable of communicating the payment record to the management center 3. In this way, when the IC card 2C is removed from the card presentation holder 21B by the user before the amount of electronic money on the IC card 2C is updated and the processing is thereby cancelled, both the IC card 2C and the store terminal 9 are maintained in a state before the processing starts. Accordingly, situations in which the amount settled by the management center 3 disagrees with the amount of electronic money on the IC card 2C are avoided.

Since the backup power supply 35 is provided, interruptions of the processing are prevented even when, for example, the plug is disconnected and the commercial power supply is cut off after the updating of the amount of electronic money has been instructed. Therefore, situations in which the amount settled by the management center 3 disagrees with the amount of electronic money on the IC card 2C are avoided.

When no response is received from the IC card 2C even after a predetermined period of time has elapsed, the user is again instructed to place the IC card 2C, and the processing is again repeated from the beginning. Therefore, even when the IC card 2C is removed within the period from the updating of the amount of electronic money on the IC card 2C to the responding from the IC card 2C, and hence the processing is canceled, it is possible to avoid situations in which the amount of electronic money on the IC card 2C is updated by overwriting the IC card 2C, subsequently the store terminal 9 records the payment, and hence the amount settled by the management center 3 disagrees with the amount of electronic money on the IC card 2C.

Since the payment is recorded in the store terminal 9 only after a response from the IC card 2C is received, the payment will not be recorded in the store terminal 9 when the IC card 2C is removed within the brief period from the updating of the electronic money on the IC card 2C to the responding from the IC card 2C. When the IC card 2C is removed to cancel the processing, and when the method of payment is changed from using electronic money to using cash, the amount settled by the management center 3 and the amount of electronic money on the IC card 2C disagree with each other. Nevertheless, it is at least possible to prevent the management center 3 from settling the payment using electronic money, and hence disadvantages to the user are avoided.

In such cases, since the store terminal 9 includes the backup power supply 35, at least situations which may give rise to disadvantages to the user are avoided.

At the stage of making the payment using electronic money, the user who has selected to pay by electronic money may change the user's mind and may wish to pay by cash or the like. The store may charge a different customer's bill to the user by mistake. In such cases, in the electronic money system 1, the cancel key is operated to cancel the payment processing using electronic money (FIGS. 5 and 6).

In this way, when the user is instructed to place the IC card and the electronic money transaction is performed, it is possible to prevent the user from performing operations such as removing the IC card in hurry so as to change the method of payment. It is thus possible to minimize situations in which data transmission and reception between the IC card and the store terminal 9 become difficult in the course of processing. By performing processing in accordance with the progress of the processing, it is possible to avoid situations in which the amount settled by the management center 3 disagrees with the amount of electronic money on the IC card. The cancellation of the processing offers advantages to the user, and hence the usability of the electronic money system 1 is improved.

The electronic money system 1 accepts canceling operations until the electronic money system 1 instructs the IC card to change the amount of electronic money. Subsequent to instructing the IC card to change the amount of electronic money, the electronic money system 1 does not accept canceling operations. It is thus possible to prevent situations in which, even when the processing has been cancelled, the amount of electronic money on the IC card is reduced. It is also possible to prevent situations in which the amount settled by the management center 3 disagrees with the amount of electronic money on the IC card. When the amount of electronic money on the IC card is reduced even though the processing has been cancelled, it is possible to employ a process of again updating the amount of electronic money in order to recover the original state. In this case, the process has disadvantages in that the process is complicated and in that the duration for which the IC card must be placed is increased. According to the present embodiment, canceling operations are not accepted after the instruction is given to update the amount of electronic money, and hence situations in which the amount settled by the management center 3 disagrees with the amount of electronic money on the IC card are avoided using a simple process.

In contrast, there are cases in which there is insufficient electronic money available to make the payment. In such cases, in the electronic money system 1, the user is informed of the outstanding money or the like when the full amount of electronic money is used to make the payment (FIG. 9). For example, when the user is to purchase items, the user may reduce the number of items to be purchased in order that the user can make the payment using electronic money. Alternatively, the user may abandon the purchase of the items, or the user may select various methods of payment, such as paying by a combination of electronic money, cash, and credit card. In this way, the usability of the electronic money system 1 is improved for the user.

In the electronic money system 1, after the user has been informed that there are insufficient funds available to make the payment, the canceling operation is performed to cancel the processing of the payment using electronic money. In contrast, when the execute option is operated, the processing of the payment using electronic money is executed so that the full amount of electronic money on the IC card is used to make the payment. Specifically, the IC card is instructed to update the amount of electronic money, and the change in the amount of electronic money is recorded so that it can be sent to the management center 3.

In the electronic money system 1, the user is asked to confirm the payment method, and the payment using electronic money is processed. Therefore, the user's desires are reflected in the processing, and the usability is improved.

If there is insufficient electronic money available, the processing is immediately canceled in response to the canceling operation. Therefore, even in the middle of computing the total amount, it is possible to allow the user to change the payment method, such as paying by cash, credit card, or the like, and to allow the user to cancel the purchase of items. Therefore, the usability is improved.

In such cases, canceling operations are not accepted after the IC card has been instructed to update the amount of electronic money. It is possible to communicate the payment record to the management center 3 after the management center 3 receives a response from the IC card. It is therefore possible to avoid situations in which the amount settled by the management center 3 disagrees with the amount of electronic money on the IC card using a simple process.

At a store in which the POS register 24 and the store terminal 9 are connected to perform transactions, for example, bar codes attached on items are read by the POS register 24, and the total payment amount is computed by key operation of the POS register 24. The store terminal 9 is configured to obtain the payment amount (FIG. 10). According to the electronic money system 1, the user is instructed to place the IC card. In response to the instruction, the user places the IC card on the card presentation holder 21B, and the payment processing is performed in which the payment amount computed by the POS register 24 is paid using electronic money (FIGS. 11 and 12). In the electronic money system 1, when using both the POS register 24 and the store terminal 9 that handles electronic money, it is possible to omit an operation to again input the payment amount to the store terminal 9 so that the payment can be made using electronic money. In this way, the burden on the salesclerk is lessened, and improper operations are avoided.

The amount paid using electronic money in this manner is communicated to the POS register 24. The POS register 24 subtracts the amount paid using electronic money from the total payment amount, and the transaction is terminated. In the electronic money system 1, it is possible to omit an operation to again input the amount paid using electronic money to the POS register 24. In this way, the burden on the salesclerk is lessened, and improper operations can be avoided.

When the store terminal 9 operates in cooperation with the POS register 24 to perform transactions in this manner, canceling operations are accepted before the updating of the electronic money is instructed. The payment record can be communicated to the management center 3 when a response from the IC card is received. Therefore, situations in which the amount settled by the management center 3 disagrees with the amount of electronic money are avoided.

When the processing is canceled in the case in which the store terminal 9 operates in cooperation with the POS register 24 to perform transactions in this manner, nothing has been paid by electronic money. Hence, a payment amount of 0 yen is sent to the POS register 24. By operating the POS register 24, the transaction can be completed by cash, credit card or the like.

When the store terminal 9 operates in cooperation with the POS register 24 to perform transactions in this manner, and when there are insufficient funds available to make the payment, the user is asked to confirm the payment method. In response to an execute instruction, the payment processing using electronic money is performed. Accordingly, in the electronic money system 1, when the store terminal 9 operates in cooperation with the POS register 24 to perform a transaction, the user is asked to confirm the payment method, and then the payment processing using electronic money is performed. In this way, the user's desires are reflected in the processing, and the usability is thus improved.

When there are insufficient funds available to make the payment, and when the user selects to pay by electronic money, in the electronic money system 1, part of the total payment amount is paid using electronic money recorded on the IC card. Subsequently, the amount paid by the electronic money is communicated to the POS register 24, so that the balance can be paid by cash or the like.

In such a case, for example, the unit price of an item is set in 100-yen units at the store so that the store does not have to give change in small coins. The amount of money recorded on the IC card may have a fractional part. In such a case, when the full amount of the electronic money recorded on the IC card is used to make the payment, the necessity of giving change in small coins in response to the payment by cash may arise.

In the electronic money system 1, the amount to be paid by electronic money is set based on payment terms set by the store terminal 9 (step SP58 in FIG. 12). Therefore, the store's intention of, for example, not keeping coins for the giving of change and the user's desires are reflected in setting the payment amount. In this way, the usability is further improved.

Specifically, according to the present embodiment, the amount of the electronic money recorded on the IC card is rounded down in predetermined units, and the amount to be paid using the electronic money is thus set. In the foregoing case, it is not necessary to give change in small coins when the balance is paid by cash, thus achieving the store's intention. Therefore, the usability of the electronic money system 1 is improved, and great advantages are offered by the electronic money system 1. In addition, improper operations by the salesclerk are avoided. In this case, the user does not receive change, and hence electronic money becomes more advantageous.

In the electronic money system 1, when the store terminal 9 records the payment using electronic money, and when the salesclerk operates the store terminal 9 to total up payment records, the records are uploaded to the management center 3 in which the balance figure of each IC card, the payment amount, the payment date, and the like are recorded in the transaction database 15. Based on these records, the management center 3 instructs the bank network 8 to settle the payments using electronic money, and hence the settlements are completed.

In the uploading process, when the totaling-up of daily sales is started by the salesclerk (FIGS. 13 to 15), a line connection is established with the management center 3. The payment records are transmitted through the line to the management center 3, and the payment records are uploaded. In this way, in the electronic money system 1, the data are uploaded to the management center 3 and a series of processes concerning payments using electronic money is completed without causing the salesclerk to be conscious of the uploading operation to the management center 3, as in the totaling-up of sales using the conventional POS register 24.

In the uploading process, the electronic money system 1 uses the total number of records as a denominator and the number of unsent records as a numerator and displays the progress of the uploading in the form of a fraction (FIG. 16). The salesclerk who executes the totaling-up process can monitor the progress from reading the display, and hence the usability of the electronic money system 1 is improved.

When uploading data through a communication line, it may take a very long period of time due to a line malfunction caused by increased traffic. Also, a line malfunction causing difficulty in establishing a connection may occur. Totaling-up operations in general are performed after business hours. When the uploading requires a very long period of time, and when it becomes difficult to perform the uploading due to a connection failure, the salesclerk cannot go home if no measure is taken to solve the problems.

According to the electronic money system 1, when a process is not completed after a predetermined period of time has elapsed, the process is terminated indistinguishably from a case in which the process is properly completed. In other words, the process in this case is intentionally terminated as if it were properly terminated. When the process is performed by a salesclerk inexperienced in operating the store terminal 9, the salesclerk is not required to perform additional operations in order to process daily transactions. The salesclerk can total the sales securely and can conduct shutdown actions and the like. Hence, the salesclerk can handle daily transactions in spite of line malfunctions.

In this case, the management center 3 can be aware of the fact that there are unsent data in the store terminal 9. In the electronic money system 1, at a predetermined time that the store terminal 9 seems to be activated, that is, at a predetermined point after the data has been downloaded after the activation, the management center 3 accesses the store terminal 9, and unsent data are uploaded. This may solve problems such as a line malfunction caused by temporary increased traffic.

When malfunctioning of a line is not fixed, an assigned maintenance staff is sent to the store. The maintenance staff connects the portable terminal 50 to the store terminal 9 (FIG. 19), and the store terminal 9 uploads unsent data to the portable terminal 50. Subsequently, the data are downloaded from the portable terminal 50 to the management server 5. In this way, in the electronic money system 1, when such a line malfunction continues, the data are uploaded from the store terminal 9 through the portable terminal 50. Accordingly, the electronic money system 1 functions properly despite the line malfunction or the like.

At this time, as in the case in which data is exchanged between the management center 3 and the store terminal 9, the portable terminal 50 enables the management center 3 and the store terminal 9 to exchange data with each other by mutual authentication and encryption using key data. Furthermore, the portable terminal 50 encrypts data obtained from the store terminal 9 and records the encrypted data. Therefore, even when a mishap such as theft occurs, the security of the system is ensured.

When the maintenance staff is sent to the store to do maintenance, the maintenance staff can confirm a connection to the management center 3 from reading the display screen for displaying the data uploading (AR in FIG. 16) in which the connection state is displayed in detail. Hence, the working efficiency of the maintenance staff is enhanced.

(9) Advantages of the Embodiment

With the above arrangement, when communicating a batch of records of the updating of electronic money to the management center through a communication line, and when the communication cannot be completed within a predetermined period of time, the communication to the management center is terminated indistinguishably from a case in which the communication to the management center is completed within the predetermined time. Therefore, when a line connected to the management center has a malfunction, it is possible to terminate the processing without performing additional processing, and hence daily transactions are completed in spite of the malfunction.

When the communication to the management center cannot be completed, the records of the uploading of electronic money are uploaded by the management center by accessing the store terminal. When the line malfunction is fixed at that moment, unsent data are uploaded. It is therefore possible to perform the settlement processing in spite of, for example, a temporary line malfunction.

By switching the operation mode, instead of communicating to the management center through a communication line, the records of the updating of electronic money are recorded in the portable terminal and are thus uploaded. For example, when a line malfunction continues, unsent data can be uploaded through the portable terminal. Hence, it is possible to perform the settlement processing in spite of the line malfunction.

By switching the operation mode, instead of obtaining data such as the invalidity list through a communication line, it is possible to obtain data required for electronic money processing transactions from the portable terminal. In this way, even when it is impossible to obtain the data through the line due to the line malfunction, the data can be obtained through the portable terminal despite the line malfunction.

In the case in which data required for electronic money processing transactions is obtained through a communication line, corresponding data possessed up until that time is updated using the obtained data, and an electronic money payment is thus processed, when it is difficult to obtain the data through the communication line, the transaction is performed based on data possessed up until that time. Therefore, even when it is difficult to obtain the data due to a line malfunction, a temporary change in the installation of the terminal unit, or the like, it is possible to perform transactions based on the data possessed up until that time. It is therefore possible to perform transactions despite the line malfunction and the like.

(10) Other Embodiments

Although the foregoing embodiment has been described with the case in which, when the records of payments cannot be uploaded within a predetermined period of time, the records are uploaded by access obtained by the management center, the present invention is not limited to this embodiment. For example, the store terminal can measure the duration, and after a predetermined period of time has elapsed, the store terminal can automatically dial up the management center and can upload the records.

Although the foregoing embodiment has been described with the case in which the store terminal uploads and downloads data using the portable terminal, the present invention is not limited to this embodiment. Alternatively, the automatic vending machine server can upload and download data using the portable terminal.

Although the foregoing embodiment has been described with the case in which transactions are processed based on the old invalidity list and key data when time has run out, the present invention is not limited to this embodiment. For example, when it is difficult to establish a connection to the management center, it is possible to immediately start processing a transaction based on the old invalidity list and the key data.

Although the foregoing embodiment has been described with the case in which the store terminal that gains access to the management center by predetermined operations processes transactions based on the old invalidity list and the key data, the present invention is not limited to this embodiment. Since similar situations may arise in the issuing terminal and the crediting terminal which exchange various data with the management center in real time due to, for example, a management server malfunction, these terminals may perform similar processing. Furthermore, the present invention can be applied to a store terminal which uploads payment records in real time.

Although the foregoing embodiment has been described with the case in which the present invention is applied to the electronic money system using a so-called closed loop system in which amounts of electronic money recorded on IC cards are recorded and controlled by the management center, the present invention is not limited to this embodiment. The present invention is also applicable to an electronic money system using a so-called open loop system.

Although the foregoing embodiment has been described with the case of separately providing the POS register employed in making payments by cash and the store terminal, which is the electronic money terminal, the present invention is not limited to this embodiment. The present invention can be applied to a case in which the POS register and the store terminal are integrated.

Although the foregoing embodiment has been described with the case in which the electronic money system is configured using contactless IC cards, the present invention is not limited to this embodiment. The present invention can be broadly applied to a case in which an electronic money system is configured using contact IC cards and to a case in which an electronic money system is configured using a portable information unit such as a cellular phone in place of an IC card.

What is claimed is:

1. An electronic money system comprising:
an electronic money terminal for updating the amount of electronic money in a portable electronic device that stores a value of the electronic money, said electronic money terminal comprising recording means for recording the updating of the electronic money; and
a management section to which an update record for the updating of the amount of the electronic money is communicated through a communication line;
wherein said electronic money terminal further comprises:
communicating means for batch communicating a plurality of update records recorded in said recording means to said management section; and
terminating means for terminating the communication to said management section indistinguishably from a case in which the communication to said management section is completed within a predetermined period when the communication is not completed within the predetermined period; and
a portable terminal, which communicates with the electronic money terminal and the management section to complete the communication of the plurality of update records to said management section when the communication is not completed within the predetermined periods wherein the portable terminal facilitates communication between the electronic money terminal and the management section by mutual authentication and stores the plurality of records in encrypted form.

2. An electronic money transaction processing method comprising:
a recording step of recording the updating of the amount of electronic money in a recording unit of an electronic money terminal;

a communicating step of batch communicating a plurality of update records recorded in said recording unit to a management section through a communication line; and a terminating step of terminating the communication to said management section indistinguishably from a case in which the communication is completed within a predetermined period when the communication to said management section is not completed within the predetermined period.

completing the communication of the plurality of update records to the management section through a portable terminal when communication to said management section through the communication line is not completed within the predetermined period. wherein the portable terminal facilitates communication between the electronic money terminal and the management section by mutual authentication and stores the plurality of records in encrvnted form.

3. An electronic money transaction processing method according to claim 2, wherein:

in said communicating step, a predetermined screen display is provided; and in said terminating step, when the communication to said management section is not completed within the predetermined period, the same screen display is provided as that provided in a case in which the communication is completed within the predetermined period.

4. An electronic money transaction processing method according to claim 2, further comprising:

a determining step of comparing a payment amount with the amount of credited electronic money and determining whether the amount of the credited electronic money is sufficient to pay the payment amount; and a menu providing step of providing, when it is determined in said determining step that the payment amount exceeds the credited amount, a menu allowing execution and cancellation of the payment transaction using the electronic money.

5. An electronic money transaction processing method comprising:

a determining step of comparing a payment amount with the amount of credited electronic money and determining whether the amount of the credited electronic money is sufficient to pay the payment amount;

a setting step of setting, when it is determined in said determining step that the payment amount exceeds the credited amount, an amount to be paid using the electronic money in accordance with payment terms; and an updating step of subtracting the amount to be paid using the electronic money, which has been set in said setting step, from the credited amount.

6. An electronic money transaction processing method according to claim 5, wherein:

the payment terms include terms allowing the giving of change in preset currency units; and the amount to be paid using the electronic money is obtained by rounding down the amount of the electronic money to a preset currency unit.

7. An electronic money transaction processing method according to claim 5, wherein the payment terms include terms allowing a predetermined input unit to input the amount to be paid using the electronic money.

8. An electronic money transaction processing method according to claim 2, further comprising: a first instructing step of instructing a portable electronic device that stores a value of electronic money to update the amount of the electronic money; and a communicating step of communicating, in response to communication from said portable electronic device that the updating is completed, the updating of the electronic money to a management section for managing the updating of the electronic money.

9. An electronic money transaction processing method according to claim 8, further comprising a second instructing step of again instructing, subsequent to said first instructing step, the updating of the electronic money when the completion of the updating is not communicated from said portable electronic device.

10. An electronic money transaction processing method according to claim 2, further comprising:

an updating step of updating the amount of electronic money stored in a portable electronic device that stores a value of the electronic money;

a communicating step of communicating the updating of the electronic money to a management section; and a canceling step of canceling, by a predetermined operation, the updating of the amount of the electronic money and the communication of the updating of the electronic money to said management section.

11. An electronic money transaction processing method according to claim 10, wherein:

the canceling of the processing by the predetermined operation is accepted until said portable electronic device is instructed to update the amount of the electronic money;

the canceling of the processing by the predetermined operation is not accepted within the period from the time at which said portable electronic device is instructed to update the amount of the electronic money to the time at which the completion of the updating is communicated from said portable electronic device; and when the completion of the updating is communicated, the updating of the electronic money can be communicated to said management section.

12. An electronic money transaction processing method according to claim 10, wherein, subsequent to the cancellation of making a payment using the electronic money, the payment can be made by cash.

13. An electronic money transaction processing method according to claim 2, further comprising:

an updating step of subtracting part of a payment amount from a portable electronic device that stores a value of electronic money and updating the amount of the electronic money stored in said portable electronic device; and a communicating step of communicating an amount partially paid to an external unit or subtracting the amount partially paid using the electronic money from the payment amount to obtain an outstanding amount and communicating the outstanding amount to the external unit.

14. An electronic money transaction processing method according to claim 13, wherein the payment amount is obtained from the external unit.

15. An electronic money transaction processing method according to claim 13, wherein the external unit includes a cash accounting machine.

16. An electronic money transaction processing method according to claim 13, wherein, in said updating step, the full amount of the electronic money stored in said portable electronic device is used to pay the amount to be paid using the electronic money.

17. An electronic money transaction processing method according to claim 13, wherein, in said updating step, the amount of the electronic money in said portable electronic device is updated, and update information is communicated to a management section.

18. An electronic money terminal comprising:
- updating means for updating the amount of electronic money recorded in a portable electronic device that stores a value of the electronic money;
- recording means for recording a pluraliw of update records corresponding to updating the amount of electronic money recorded in the portable electronic device:
- communicating means for communicating the updating of the amount of the electronic money to the plurality of update records to a management section through a communication line;
- terminating means for terminating the communication to said management section indistinguishably from a case in which the communication to said management section is completed within a predetermined period when the communication is not completed within the predetermined period; and
- operation mode switching means for switching between the communication of the updating of the amount of the electronic money through the communication line and the recording of the updating of the electronic money in a portable terminal when the communication is not completed within the predetermined period that facilitates communication between the electronic money terminal and the management section by mutualauthcnticaticn and encryption using key data, wherein the portable terminal facilitates communication between the electronic money terminal and the manaaement section by mutual authentication and stores the plurality of records in encrypted form.

19. An electronic money terminal to claim 18, wherein the data required for electronic money processing includes data on invalid portable electronic devices.

20. An electronic money terminal according to claim 18, wherein the data required for electronic money processing includes key data required to communicate the updating of the electronic money to said management section.

* * * * *